US012281461B2

(12) United States Patent
Hewitt et al.

(10) Patent No.: US 12,281,461 B2
(45) Date of Patent: Apr. 22, 2025

(54) HYDRAULIC SYSTEM

(71) Applicant: J. C. Bamford Excavators Limited, Uttoxeter (GB)

(72) Inventors: James Hewitt, Uttoxeter (GB); Paul Brenner, Uttoxeter (GB); Ravi Shankar, Uttoxeter (GB)

(73) Assignee: J. C. Bamford Excavators Limited, Uttoxeter (GB)

( * ) Notice: Subject to any disclaimer, the term of this patent is extended or adjusted under 35 U.S.C. 154(b) by 530 days.

(21) Appl. No.: 17/689,975

(22) Filed: Mar. 8, 2022

(65) Prior Publication Data

US 2022/0282454 A1 Sep. 8, 2022

(30) Foreign Application Priority Data

Mar. 8, 2021 (GB) ..................................... 2103208

(51) Int. Cl.
*E02F 9/22* (2006.01)
*E02F 3/32* (2006.01)
(Continued)

(52) U.S. Cl.
CPC ............ *E02F 9/2228* (2013.01); *E02F 3/325* (2013.01); *E02F 3/425* (2013.01); *E02F 3/435* (2013.01);
(Continued)

(58) Field of Classification Search
CPC ......... E02F 9/2228; E02F 3/325; E02F 3/425; E02F 3/435; E02F 9/02; E02F 9/2235;
(Continued)

(56) References Cited

U.S. PATENT DOCUMENTS

2002/0148223 A1* 10/2002 Reiners .................... F01P 7/044 60/422
2009/0159143 A1* 6/2009 Nishikawa ............ E02F 9/2228 137/625.64

(Continued)

FOREIGN PATENT DOCUMENTS

DE 4120665 A1 12/1992
DE 19612582 A1 10/1997

(Continued)

OTHER PUBLICATIONS

Search Report for GB2103208.1, dated Nov. 24, 2021.
Search Report for GB 2103209.9, dated Nov. 26, 2021.

*Primary Examiner* — Thomas E Worden
*Assistant Examiner* — Jay Khandpur
(74) *Attorney, Agent, or Firm* — MARSHALL, GERSTEIN & BORUN LLP

(57) ABSTRACT

A hydraulic system for a working vehicle, the hydraulic system includes a hydraulically actuated device; a hydraulic pump assembly for supplying a variable output of hydraulic fluid to the hydraulically actuated device; and a proportional control valve, wherein the hydraulic system is arranged such that hydraulic fluid exiting the hydraulically actuated device flows through a restriction of the proportional control valve; and wherein the hydraulic system is configured to control a flow of hydraulic fluid supplied to the hydraulically actuated device by varying the output of hydraulic fluid from the hydraulic pump assembly, and to control a flow of hydraulic fluid exiting the hydraulically actuated device via adjusting a restriction area of the proportional control valve.

67 Claims, 6 Drawing Sheets

(51) Int. Cl.

| | |
|---|---|
| ***E02F 3/42*** | (2006.01) |
| ***E02F 3/43*** | (2006.01) |
| ***E02F 9/02*** | (2006.01) |
| ***F15B 13/02*** | (2006.01) |
| ***F15B 19/00*** | (2006.01) |

(52) U.S. Cl.
CPC .............. *E02F 9/02* (2013.01); *E02F 9/2235* (2013.01); *E02F 9/2267* (2013.01); *E02F 9/2271* (2013.01); *E02F 9/2292* (2013.01); *E02F 9/2296* (2013.01); *F15B 13/02* (2013.01); *F15B 19/00* (2013.01); *E02F 9/2285* (2013.01)

(58) Field of Classification Search
CPC ..... E02F 9/2267; E02F 9/2271; E02F 9/2292; E02F 9/2296; E02F 9/2285; F15B 13/02; F15B 19/00
See application file for complete search history.

(56) References Cited

U.S. PATENT DOCUMENTS

| | | | | |
|---|---|---|---|---|
| 2014/0116038 | A1 | 5/2014 | Pfaff et al. | |
| 2016/0032817 | A1* | 2/2016 | Buschur .................. | F02B 39/04 60/605.1 |
| 2018/0051444 | A1 | 2/2018 | Yamashita et al. | |
| 2018/0051720 | A1 | 2/2018 | Hijikata et al. | |
| 2018/0106278 | A1 | 4/2018 | Amano et al. | |
| 2018/0320674 | A1 | 11/2018 | Clev | |
| 2019/0186105 | A1 | 6/2019 | Imura et al. | |
| 2020/0230115 | A1* | 7/2020 | McCormack ........ | A61K 9/0073 |
| 2020/0232179 | A1* | 7/2020 | Sasaki ................... | E02F 9/2041 |
| 2020/0256034 | A1* | 8/2020 | Yamamoto ............ | E02F 9/2228 |
| 2021/0222395 | A1* | 7/2021 | Matsuyama ............ | E02F 3/435 |
| 2023/0078399 | A1* | 3/2023 | Nakajima ............. | E02F 9/2228 73/1.72 |

FOREIGN PATENT DOCUMENTS

| | | | |
|---|---|---|---|
| EP | 0533958 | A1 | 3/1993 |
| EP | 0857871 | A1 | 1/1998 |
| EP | 1750017 | A1 | 2/2007 |
| EP | 2541072 | A2 | 1/2013 |
| EP | 3489424 | A1 | 5/2019 |
| EP | 3674563 | A1 | 7/2020 |
| JP | 2019199726 | A | 11/2019 |
| WO | WO-2014/036232 | A1 | 3/2014 |
| WO | WO-2017/077060 | A1 | 5/2017 |

* cited by examiner

HYDRAULIC SYSTEM

FIELD

The present disclosure relates to a hydraulic system, and a working vehicle including a hydraulic system.

BACKGROUND

Working vehicles such as excavators, backhoe loaders, telehandlers, skid-steer loaders, dumpers and the like often have one or more hydraulically actuated devices such as working arm actuators, track motors, bucket actuators etc. Such hydraulically actuated devices operate by receiving a flow of hydraulic fluid from a hydraulic pump.

A flow of hydraulic fluid from a hydraulic pump to a hydraulically actuated device (e.g. a hydraulic actuator or motor) needs to be controlled to provide stable operation of the hydraulically-actuated device. Similarly, a flow of hydraulic fluid leaving a hydraulically actuated device also needs to be controlled to prevent overrunning of loads on the hydraulically actuated device and to provide stable control of passive loads.

Typically, the flow rate of hydraulic fluid supplied to a hydraulically-actuated device is controlled by varying a "meter in" area of a proportional control valve. For a given pump output, a smaller "meter in" area results in a lower flow rate of hydraulic fluid to the hydraulically-actuated device than a larger "meter in" area. Similarly, the flow rate and pressure of hydraulic fluid expelled from a hydraulically-actuated device is often controlled by varying a "meter out" area of a proportional control valve. For a given pump output and "meter in" area, a smaller "meter out" area results in a lower flow rate of hydraulic fluid from the hydraulically-actuated device than a larger "meter out" area. In addition, the lower flow rate of hydraulic fluid associated with a smaller "meter out" area results in an increase of pressure in a hydraulic fluid line connecting the hydraulically-actuated device to the proportional control valve.

The size of the "meter in" and "meter out" areas is varied in order to optimise flow rates and pressures of hydraulic fluid supplied to or expelled from a hydraulically-actuated device. For example, when a hydraulic cylinder is used to move a load in a direction which is complemented by gravity, this can lead to a "runaway load" which results in cavitation of the hydraulic cylinder. In such a situation, the "meter out" area may be decreased to reduce the flow rate of hydraulic fluid exiting the hydraulic cylinder and increase the pressure on the outlet side of the hydraulic cylinder. This ensures stable movement of the load.

As another example, when a single hydraulic pump is required to provide hydraulic fluid to two or more hydraulically-actuated devices, the hydraulic fluid supplied by the pump is shared between the hydraulically-actuated devices based on the size of the respective "meter in" areas. For example, increasing the size of the "meter in" area for a first hydraulically-actuated device relative to the size of the "meter in" area for a second hydraulically-actuated device (e.g. by varying the restriction of an associated pressure compensator) results in an increase in the proportion of pump output which is supplied to the first hydraulically-actuated device.

A downside of restricting the "meter in" area to control a flow of fluid to a hydraulically-actuated device is that it results in an increase in pressure upstream of the proportional control valve, which reduces the efficiency of the hydraulic system (e.g. due to an increased temperature associated with the increased pressure).

The present disclosure seeks to overcome, or at least mitigate, one or more problems of the prior art.

SUMMARY

According to a first aspect of the disclosure, a hydraulic system for a working vehicle is provided, the hydraulic system comprising:

- a hydraulically actuated device;
- a hydraulic pump assembly for supplying a variable output of hydraulic fluid to the hydraulically actuated device; and
- a proportional control valve, wherein the hydraulic system is arranged such that hydraulic fluid exiting the hydraulically actuated device flows through a restriction of the proportional control valve; and
- wherein the hydraulic system is configured to control a flow of hydraulic fluid supplied to the hydraulically actuated device by varying the output of hydraulic fluid from the hydraulic pump assembly, and to control a flow of hydraulic fluid exiting the hydraulically actuated device via adjusting a restriction area of the proportional control valve.

By having a hydraulic pump assembly configured to supply a variable output of hydraulic fluid to the hydraulically actuated device, a reduced flow of hydraulic fluid to the hydraulically actuated device can be achieved via reducing the output from the pump assembly (i.e. rather than restricting a flow of hydraulic fluid from the pump across a valve). This has been found to lead to increased efficiency of the hydraulic system.

Optionally, the hydraulic system is configured so that restriction of the proportional control valve is controlled independently to the output from the hydraulic pump assembly such that pressure of an inlet side of the hydraulically actuated device is controlled independently of the pressure of an outlet side of the hydraulically actuated device.

The restriction of the proportional control valve being controlled independently to the output from the hydraulic pump assembly such that the pressure of an inlet side of a hydraulically actuated device is controlled separately to (i.e. independently of) the pressure of an outlet side of the hydraulically actuated device has been found to improve system controllability and increase efficiency of the hydraulic system.

Optionally, the proportional control valve is moveable within a first opening range between a first opening position and a second opening position.

Optionally, the proportional control valve defines a first flow path through which a flow of hydraulic fluid from the hydraulically actuated device flows, and wherein the proportional control valve is configured so that a size of a restriction area of the first flow path decreases as the proportional control valve is moved from the first opening position to the second opening position in order to increase a pressure of hydraulic fluid in an outlet side of the hydraulically actuated device.

Such a configuration allows a flow of hydraulic fluid from the hydraulically actuated device to be controlled via altering the position of the proportional control valve (and thus altering the restriction area of the flow path for hydraulic fluid leaving the hydraulically actuated device).

Optionally, the proportional control valve defines a second flow path, and wherein the hydraulic system is arranged such that the proportional control valve connects the hydraulic pump assembly to the hydraulically actuated device so that hydraulic fluid supplied by the hydraulic pump assembly to the hydraulically actuated device flows through the second flow path.

Optionally, the proportional control valve is a directional proportional control valve.

The proportional control valve being a directional proportional control valve allows the hydraulically actuated device to be actuated in two directions (e.g. extension/retraction of a hydraulic cylinder, or clockwise/anti-clockwise rotation of a hydraulic motor) by changing the direction of the directional proportional control valve. This removes the need for additional control valves to change an actuation direction of the hydraulically actuated device.

Optionally, the proportional control valve is configured so that a pressure differential across a restriction area of the second flow path is less than 10% of a maximum system pressure when the opening position of the proportional control valve is within said first opening range.

The pressure differential across the restriction area of the second flow path being less than 10% of the maximum system pressure (within the first opening range) allows flow and pressure of hydraulic fluid in the inlet side to be controlled predominantly by varying the output from the hydraulic pump assembly. This allows independent control of the flows of hydraulic fluid to/from the hydraulically actuated device (and of pressures in the inlet and outlet sides of the hydraulically actuated device) without the need for separate "independent metering" valves. In other words, this configuration of the proportional control valve provides a simple and cheap valve arrangement for achieving "independent metering" functionality using a conventional type of proportional control valve (e.g. a conventional directional spool valve).

Optionally, the hydraulic system further comprises a plurality of hydraulically actuated devices and a corresponding plurality of proportional control valves, wherein the hydraulic system is arranged so that hydraulic fluid exiting each of the hydraulically actuated devices flows through a restriction of a respective proportional control valve.

A plurality of hydraulically actuated devices allow multiple functions of a working vehicle to be controlled (e.g. independent control of working arm raising/lowering and pivoting, working implement actuation, left and right movement tracks, etc.). Each hydraulically actuated device being connected to a respective proportional control valve allows flows to/from the hydraulically actuated devices to be controlled independently of each other.

Optionally, the hydraulic system further comprises a plurality of hydraulic pump assemblies for supplying a variable output of hydraulic fluid to the hydraulically actuated devices.

Having a plurality of hydraulic pump assemblies reduces the requirement for hydraulic fluid from a given hydraulic pump assembly to be shared between multiple hydraulically actuated devices, which reduces the amount of parallel/confluence losses and thus increases the efficiency of the hydraulic system. In other words, having multiple hydraulic pump assemblies facilitates a de-coupling of hydraulically actuated devices which are driven by different pump assemblies, thus increasing hydraulic system efficiency.

Optionally, the number of hydraulic pump assemblies corresponds to the number of hydraulically actuated devices, wherein the hydraulic system is configured to control a flow of hydraulic fluid entering each hydraulically actuated device via varying the output of hydraulic fluid from a respective hydraulic pump assembly, and to control a flow of hydraulic fluid exiting each hydraulically actuated device via varying a restriction of a respective proportional control valve.

Having an equal number of hydraulic pump assemblies and hydraulically actuated devices eliminates the requirement for hydraulic fluid from a given hydraulic pump assembly to be shared between multiple hydraulically actuated devices. This eliminates parallel/confluence losses and thus increases the efficiency of the hydraulic system. In other words, each hydraulically actuated device is effectively de-coupled from the other hydraulically actuated devices, thus increasing hydraulic system efficiency.

Optionally, the number of hydraulic pump assemblies is less than the number of hydraulically actuated devices, and wherein one or more of the hydraulic pump assemblies is a shared pump assembly for supplying hydraulic fluid to two or more hydraulically actuated devices.

Optionally, the hydraulic system is configured so that the shared pump assembly supplies hydraulic fluid to two or more hydraulically actuated devices simultaneously.

Having one or more shared pump assemblies each for supplying hydraulic fluid to two or more hydraulically actuated devices (e.g. devices which typically operate under similar load pressures) reduces the total number of pumps required which leads to lower pumping system cost and physical size. In other words, sharing pump flow between some hydraulically actuated devices (e.g. devices which are less commonly used together, such as a track motor and a working arm actuator on an excavator) can lead to a cheaper/smaller pump system.

Optionally, each of the hydraulically actuated devices supplied by the shared pump assembly is connected to the shared pump assembly via a respective pressure compensator, and wherein the pressure compensators are arranged to restrict flow into their respective hydraulically actuated devices to control a share of the flow of hydraulic fluid supplied by the shared pump assembly between multiple hydraulically actuated devices.

Such a pressure compensator configuration allows hydraulic fluid to be appropriately apportioned between hydraulically actuated devices.

Optionally, each pressure compensator is biased open by a spring, wherein a compensator opening area of each pressure compensator is controlled by a pressure differential across a restriction area of the second flow path of a respective proportional control valve, and wherein the proportional control valve is configured so that said pressure differential across the restriction area of said second flow path is less than a set value of the pressure compensator spring when the opening position of the proportional control valve is within the first opening range and is greater than said set value of the pressure compensator spring when the opening position of the proportional control valve is outside the first opening range.

Having the pressure differential across the restriction area of said second flow path being less than a set value of the pressure compensator spring ensures that a restriction area of the pressure compensator is fully open when the proportional control valve is in the first opening range (e.g. in an operating condition where the shared pump assembly is only supplying hydraulic fluid to a single hydraulically actuated device). Such a configuration also facilitates simple control of the pressure compensators when it is required to share pump flow between multiple hydraulically actuated devices—e.g. by setting the opening positions of the associated proportional control valves to a value outside the first opening range so that said pressure differentials across the restriction areas of said second flow paths are greater than the set value of the spring.

Optionally, the set value of the spring of each pressure compensator is in the range of 2 to 15 bar; optionally, within the range of 5 to 10 bar.

Optionally, the plurality of hydraulically-actuated devices comprise a left-hand track motor for actuating a left-hand track of the working vehicle and a right-hand track motor for actuating a right-hand track of the working vehicle, and wherein the left-hand track motor is supplied with hydraulic fluid from a first of the hydraulic pump assemblies and the right-hand track motor is supplied with hydraulic fluid from a second of the hydraulic pump assemblies.

Left and right track motors are commonly used in tandem on a working vehicle such as an excavator (e.g. when moving in a straight line). Therefore, having the left and right track motors supplied by different hydraulic pump assemblies provides for independent straight line tracking control and reliable movement of a working vehicle.

Optionally, the first of the hydraulic pump assemblies is a shared pump assembly for supplying hydraulic fluid to the left-hand track motor and a first working arm actuator for actuating a working arm of the working vehicle, and/or wherein the second of the hydraulic pump assemblies is a shared pump assembly for supplying hydraulic fluid to the right-hand track motor and a second working arm actuator for actuating a working arm of the working vehicle.

Track motors are not regularly used in tandem with working arm actuators of a working vehicle. For example, most commonly, a working vehicle moves with the working arm stationary, or is stationary whilst moving the working arm. Therefore, supplying a track motor and a working arm actuator with hydraulic fluid from the same hydraulic pump assembly is less likely to result in parallel losses (due to restriction of pressure compensators/proportional control valves) than if devices which are typically actuated together share a common hydraulic pump assembly.

Nevertheless, in operating conditions where a track motor and working arm actuator are actuated simultaneously (e.g. during a grading operation), such a hydraulic system configuration still permits simultaneous actuation via control of the respective pressure compensators and/or proportional control valves to share the flow of hydraulic fluid from the shared pump assembly.

Optionally, the plurality of hydraulically-actuated devices comprise a boom actuator for raising or lowering a working arm of the working vehicle and a dipper arm actuator for pivoting a dipper arm of the working vehicle relative to a boom of the working vehicle, and wherein the boom actuator is supplied with hydraulic fluid from one of the hydraulic pump assemblies and the dipper arm actuator is supplied with hydraulic fluid from a different one of the hydraulic pump assemblies.

Boom and dipper arm actuators are commonly used in tandem on a working vehicle such as an excavator (e.g. when extending the position of an implement relative to a chassis of the working vehicle via lowering the boom and pivoting the dipper arm upwards). Therefore, having the boom and dipper arm actuators supplied by different hydraulic pump assemblies provides for independent working arm limb control and reliable movement of the working arm.

Optionally, the or each hydraulic pump assembly is driven by a respective electric motor, and wherein the hydraulic system is configured such that output of hydraulic fluid from the or each hydraulic pump assembly is varied by adjusting the rotation speed of said electric motor.

Such an arrangement provides for simple and effective control of the output of hydraulic fluid from the hydraulic pump assembly. Furthermore, use of an electric motor to drive the pump assembly is particularly beneficial when the working vehicle is an electric working vehicle or a fuel cell powered working vehicle without an internal combustion engine to provide a mechanical drive for the pump assembly, or a hybrid working vehicle in which an internal combustion engine is not operated continuously.

Optionally, the or each hydraulic pump assembly is driven by a mechanically-driven shaft and comprises a variable displacement pump.

Such an arrangement provides for simple and effective control of the output of hydraulic fluid from the hydraulic pump assembly when a mechanical source of power is available (e.g. in a traditional working vehicle powered by an internal combustion engine).

Optionally, the hydraulic system further comprises a control system configured to control the flow rate and/or pressure of hydraulic fluid flowing through the hydraulic system.

Optionally, the control system is configured to set an output command of the or each hydraulic pump assembly.

Optionally, the control system is configured to calculate a target velocity for the or each hydraulically actuated device based on one or more user inputs of the working vehicle, and set a flow command of the or each hydraulic pump assembly based on the or each target velocity.

In this way, a pump flow required to move a hydraulically actuated device at a required speed is set directly by the control system, which removes the need for flow of hydraulic fluid from the pump to be restricted and increases hydraulic system efficiency.

Optionally, the control system is configured to set an opening position command of the or each proportional control valve to vary the restriction of the proportional control valve.

Optionally, the control system is configured to determine a loading condition of the or each hydraulically actuated device and to adjust the restriction area of the respective proportional control valve in order to inhibit cavitation of said hydraulically actuated device.

Optionally, the control system is configured to estimate the loading condition of the or each hydraulically actuated device through use of a look-up table of typical loading conditions.

Optionally, the control system is configured to estimate the loading condition of the or each hydraulically actuated device based on a position of one or more user inputs, such as joysticks, levers, pedals or the like.

Optionally, the control system is configured to determine the loading condition of the or each hydraulically actuated device as a function of a measured pressure of hydraulic fluid supplied by the or each hydraulic pump assembly.

Optionally, the control system is configured to determine the loading condition of the or each hydraulically actuated device based on a measured pressure at an outlet port of the or each hydraulically actuated device and/or a measured pressure at an inlet port of the or each hydraulically actuated device.

Optionally, the control system is configured to determine the loading condition of the or each hydraulically actuated device as a function of a measured force acting on the or each hydraulically actuated device.

Optionally, the control system is configured to determine the loading condition of the or each hydraulically actuated device as a function of a measured position of the or each hydraulically actuated device or a measured position of one or more elements of said working machine that are actuated by the hydraulically actuated device(s).

Optionally, the control system is configured to:

monitor a loading condition of the or each hydraulically actuated device;

compare the or each of said monitored loading conditions against a respective loading condition threshold;

when one of said monitored loading conditions is less than its respective loading condition threshold, set an opening position command to decrease a restriction area of the first flow path of the respective proportional control valve; and when one of said monitored loading conditions is greater than its respective loading condition threshold, set an opening position command to increase the restriction area of the first flow path of the respective proportional control valve.

Optionally, the control system is configured to:

monitor a pressure of hydraulic fluid supplied by the or each hydraulic pump assembly;

compare the or each of said monitored pressures against a respective pressure threshold;

when one of said monitored pressures is less than its respective pressure threshold, set an opening position command to decrease a restriction area of the first flow path of the respective proportional control valve; or when one of said monitored pressures is greater than its respective pressure threshold, set an opening position command to increase the restriction area of the first flow path of the respective proportional control valve.

Optionally, the control system is further configured to filter pressure signals indicative of the pressure of hydraulic fluid supplied by the or each hydraulic pump assembly.

Such a configuration has been found to provide stable control of the hydraulically actuated device(s) even with significant variations on load. Furthermore, such a configuration has been found to provide effective control with a limited number of pressure transducers (e.g. only a pressure transducer for the or each hydraulic pump assembly).

Optionally, the hydraulic system further comprises a plurality of hydraulically actuated devices and a plurality of hydraulic pump assemblies, wherein:

the number of hydraulic pump assemblies is less than the number of hydraulically actuated devices;

one or more of the hydraulic pump assemblies is a shared pump assembly for supplying hydraulic fluid to two or more hydraulically actuated devices;

wherein each of the hydraulically actuated devices supplied by the shared pump assembly is connected to the shared pump assembly via a respective proportional control valve and the control system is configured to set an opening position of each proportional control valve to vary a restriction area of said proportional control valve in order to control a share of the flow of hydraulic fluid supplied by the shared pump assembly between multiple hydraulically actuated devices.

Optionally, the control system is configured to determine a required opening position of each proportional control valve based on the operating conditions of its respective hydraulic pump assembly and hydraulically actuated device.

Optionally, the hydraulic system further comprises a plurality of hydraulically actuated devices and a plurality of hydraulic pump assemblies, wherein:

the number of hydraulic pump assemblies is less than the number of hydraulically actuated devices;

one or more of the hydraulic pump assemblies is a shared pump assembly for supplying hydraulic fluid to two or more hydraulically actuated devices;

wherein each of the hydraulically actuated devices supplied by the shared pump assembly is connected to the shared pump assembly via a respective pressure compensator, and the control system is configured to set an opening position of each pressure compensator to vary a restriction area of said pressure compensator in order to control a share of the flow of hydraulic fluid supplied by the shared pump assembly between multiple hydraulically actuated devices.

Optionally, the control system is configured to determine a required opening position of each pressure compensator based on the operating conditions of its respective hydraulic pump assembly and proportional control valve.

Having one or more shared pump assemblies each configured to supply hydraulic fluid to two or more hydraulically actuated devices reduces the total number of pumps required which leads to lower pumping system cost and physical size. In other words, sharing pump flow between some hydraulically actuated devices (e.g. devices which are less commonly used together, such as a track motor and a working arm actuator on an excavator) can lead to a cheaper/smaller pump system.

Furthermore, such a pressure compensator configuration allows hydraulic fluid to be efficiently apportioned between hydraulically actuated devices.

According to a second aspect of the disclosure, a hydraulic system for a working vehicle is provided, the hydraulic system comprising:

a first group of hydraulically actuated devices which are actuated simultaneously to carry out a first set of functions of said working vehicle and which are not actuated in order to carry out a second set of functions of said working vehicle;

a second group of hydraulically actuated devices which are actuated simultaneously to carry out the second set of functions of said working vehicle and which are not actuated in order to carry out the first set of functions of said working vehicle; and two or more hydraulic pump assemblies for supplying hydraulic fluid to the hydraulically actuated devices of the first and second groups;

wherein the hydraulic system is arranged so that each hydraulically actuated device of the first group is supplied by a different one of the hydraulic pump assemblies;

wherein the hydraulic system is arranged so that each hydraulically actuated device of the second group is supplied by a different one of the hydraulic pump assemblies; and wherein at least one of the hydraulic pump assemblies is arranged for supplying hydraulic fluid to both a hydraulically actuated device of the first group and a hydraulically actuated device of the second group.

Having each hydraulically actuated device of the first group supplied by a different hydraulic pump assembly reduces parallel efficiency losses associated with sharing flow from a single pump (e.g. via actuation of associated proportional control valves and/or pressure compensators), since each actuator used simultaneously for performing a function of the first group is driven by an independent pump assembly.

Similarly, having each hydraulically actuated device of the second group supplied by a different hydraulic pump assembly reduces parallel efficiency losses associated with sharing flow from a single pump (e.g. via actuation of associated proportional control valves and/or pressure compensators), since each actuator used simultaneously for performing a function of the second group is driven by an independent pump assembly.

Having at least one hydraulic pump assembly arranged for supplying hydraulic fluid to both a hydraulically actuated device of the first group and a hydraulically actuated device of the second group reduces the total number of hydraulic pump assemblies required (which reduces the cost/physical size of the hydraulic system), whilst reducing the likelihood of a single hydraulic pump assembly being used to actuate multiple devices simultaneously and the associated parallel/confluence losses (since devices from the first and second group are not typically actuated simultaneously whilst performing functions of the first group or whilst performing functions of the second group).

In other words, hydraulically actuated devices which are typically actuated simultaneously are effectively de-coupled because they are supplied by different hydraulic pump assemblies.

Optionally, the first set of functions relates to movement of a working arm of said working vehicle, and wherein the first group of hydraulically actuated devices comprises two or more actuators associated with movement of said working arm.

Optionally, the first group of hydraulically actuated devices comprises at least two of: a boom actuator, a dipper arm actuator and/or an implement actuator.

Optionally, the first set of functions comprises: excavating material with a working arm; raising/lowering a working arm; slewing the working arm about a vertical axis; and/or dumping excavated material from the working arm.

Optionally, the second set of functions relates to movement of a chassis of said working vehicle, and wherein the second group of hydraulically actuated devices comprises two or more actuators associated with movement of the chassis.

Optionally, the second group of hydraulically actuated devices comprises a left track motor and a right track motor.

Optionally, the second group of hydraulically actuated devices comprises a dozer actuator.

Optionally, the second set of functions comprises: moving said chassis (e.g. forward or backwards in a straight line or curved path, or rotating about a vertical axis); and/or levelling material with a dozer blade (e.g. moving said chassis whilst simultaneously actuating a dozer blade).

Optionally, the first group of hydraulically actuated devices comprises: a boom actuator for raising/lowering a boom of a working arm; a dipper actuator for pivoting a dipper arm of a working arm with respect to said boom; and an implement actuator for pivoting, extending or otherwise actuating an implement coupled to said dipper arm;

- wherein the second group of hydraulically actuated devices comprises a left track motor, a right track motor;
- wherein the left track motor and one of the boom actuator, dipper actuator and implement actuator are driven by a first of the hydraulic pump assemblies;
- wherein the right track motor and another of the boom actuator, dipper actuator and implement actuator are driven by a second of the hydraulic pump assemblies; and
- wherein the other of the boom actuator, dipper actuator and implement actuator is driven by a third of the hydraulic pump assemblies.

Such a hydraulic system configuration has been found to be a particular efficient way of de-coupling hydraulically actuated devices which are typically actuated simultaneously, and thus reducing the hydraulic system efficiency losses associated with parallel flows of hydraulic fluid driven by a shared pump assembly. Furthermore, the hydraulically actuated devices which are driven by the same hydraulic pump assembly of this configuration typically operate at similar load pressures, which allows optimal sizing of each hydraulic pump assembly, and reduces the amount of restriction/compensation required to split the flow when multiple devices are actuated by a shared pump assembly simultaneously.

Optionally, the second group of hydraulically actuated devices further comprises a dozer actuator for actuating a dozer blade of said working vehicle, wherein the dozer actuator is driven by the third of the hydraulic pump assemblies.

When levelling ground using a dozer blade, the dozer actuator, left track motor and right track motor are actuated simultaneously. Therefore, having a dozer actuator driven by the third hydraulic pump assembly, while the left and right track motors are driven by first and second pump assemblies respectively, ensures that each of these hydraulically actuated devices which are actuated simultaneously to carry out the levelling function are supplied by independent hydraulic pump assemblies.

Optionally, the dipper actuator and one of the left or right track motors are driven by the first hydraulic pump assembly; the implement actuator and the other of the left or right track motors, and optionally a slew motor, are driven by the second hydraulic pump assembly; and the boom actuator and dozer actuator are driven by the third hydraulic pump assembly.

Such a hydraulic system configuration has been found to be a particular efficient way of de-coupling hydraulically actuated devices which are typically actuated simultaneously, and thus reducing the hydraulic system efficiency losses associated with parallel flows of hydraulic fluid driven by a shared pump assembly.

Optionally, one or more hydraulically actuated devices of the first group and one or more hydraulically actuated devices of the second group are actuated simultaneously to carry out a third set of functions of said working vehicle.

Optionally, the third set of functions relate to simultaneous movement of a chassis of said working vehicle and movement of a working arm of said working vehicle (e.g. spreading excavated material by dumping with a working arm whilst moving a chassis of the working vehicle).

Having a hydraulic system in which actuators from the first and second groups of actuators can be actuated simultaneously during a third function (e.g. a non-typical operating condition in which the chassis and working arm of the working vehicle are moved simultaneously) allows full functionality of the working vehicle.

According to a third aspect of the disclosure, a working vehicle is provided, the working vehicle comprising a hydraulic system as disclosed herein.

Optionally, the working vehicle is an excavator.

Optionally, the working vehicle is an electric working vehicle.

Optionally, the working vehicle is a fuel cell powered working vehicle (e.g. comprising a hydrogen fuel cell for powering the working vehicle).

Optionally, the working vehicle is a hybrid working vehicle of the kind having an electric source of power and an alternative source of power.

The hydraulic system of the first aspect of the disclosure has been found to significantly reduce hydraulic system losses by up to 50% compared to traditional independent metering hydraulic systems. Therefore, when the hydraulic system is used on an electric or hybrid working vehicle, this leads to a proportionate reduction in battery energy consumption. Similarly, when the hydraulic system is used on a fuel cell powered working vehicle, this leads to a proportionate reduction in fuel consumption.

According to a fourth aspect of the disclosure, a method of controlling a hydraulic system for a working vehicle is provided, the method comprising:

- calculating a target velocity for each of one or more hydraulically actuated devices from one or more user inputs;
- setting a flow command of each of one or more hydraulic pump assemblies in response to the one or more calculated target velocities;
- supplying hydraulic fluid from the one or more hydraulic pump assemblies to a respective one or more inlets of the one or more hydraulically actuated devices;
- determining a loading condition of each of the one or more hydraulically actuated devices; and
- adjusting a restriction area of a first flow path of one or more proportional control valves each connected to an outlet of a respective hydraulically actuated device, in order to inhibit cavitation of said hydraulically actuated device.

Optionally, the method further comprises:

- monitoring a loading condition of the or each hydraulically actuated device;
- comparing the or each of said monitored loading conditions against a respective loading condition threshold;
- decreasing a restriction area of the first flow path of the respective proportional control valve when one of said monitored loading conditions is less than its respective loading condition threshold; and
- increasing the restriction area of the first flow path of the respective proportional control valve when one of said monitored loading conditions is greater than its respective loading condition threshold.

Optionally, the method comprises:

- monitoring a pressure of hydraulic fluid supplied by the hydraulic pump assembly and comparing said pressure against a threshold pressure;
- decreasing a restriction area of a first flow path of a proportional control valve connected to an outlet of the hydraulically actuated device when the pressure of hydraulic fluid supplied by the hydraulic pump assembly is below the threshold pressure; and
- increasing the restriction area of the first flow path of the proportional control valve when the pressure of hydraulic fluid supplied by the hydraulic pump assembly is greater than or equal to the threshold pressure.

Such a method has been found to provide efficient and stable control of a hydraulic system.

Optionally, the method further comprises:

- calculating a plurality of target velocities for a plurality of hydraulically actuated devices from a plurality of user inputs;
- setting a flow command of one or more hydraulic pump assemblies in response to the calculated target velocities, wherein the number of hydraulic pump assemblies is less than the number of hydraulically-actuated devices and one or more of the hydraulic pump assemblies is a shared pump assembly for supplying hydraulic fluid to two or more hydraulically actuated devices via a corresponding two or more pressure compensators; and
- controlling the share of hydraulic fluid supplied by each shared pump assembly to its associated two or more hydraulically actuated devices by setting an opening position for each pressure compensator to vary a restriction area of said pressure compensator.

Having one or more shared pump assemblies each configured to supply hydraulic fluid to two or more hydraulically actuated devices reduces the total number of pumps required which leads to lower pumping system cost and physical size. In other words, sharing pump flow between some hydraulically actuated devices (e.g. devices which are less commonly used together, such as a track motor and a working arm actuator on an excavator) can lead to a cheaper/smaller pump system.

Furthermore, such a pressure compensator configuration allows hydraulic fluid to be appropriately apportioned between hydraulically actuated devices.

According to a fifth aspect of the disclosure, a proportional control valve is provided, the proportional control valve comprising:

- a pump port for receiving hydraulic fluid from a hydraulic pump;
- a tank port for supplying hydraulic fluid to a tank; and
- first and second actuator ports for supplying hydraulic fluid to or receiving hydraulic fluid from a hydraulic actuator;
- wherein the proportional control valve defines a first flow path through which a flow of hydraulic fluid from the first or second actuator ports flows to the tank port and a second flow path through which a flow of hydraulic fluid from the pump port flows to the first or second actuator ports;
- wherein the proportional control valve is moveable within a first opening range between a first opening position and a second opening position;
- wherein the proportional control valve is configured so that the size of a restriction area of the first flow path decreases as the proportional control valve is moved from the first opening position to the second opening position in order to increase a pressure differential between the first or second actuator port and the tank port; and
- wherein the proportional control valve is configured so that a pressure differential across a restriction area of the second flow path is less than 10% of a maximum system pressure when the opening position of the proportional control valve is within said first opening range.

The pressure differential across the restriction area of the second flow path being less than 10% of the maximum system pressure (within the first opening range) allows flow and pressure of hydraulic fluid in the inlet side to be controlled predominantly by varying the output from the hydraulic pump assembly. This allows independent control of the flows of hydraulic fluid to/from the hydraulically actuated device (and of pressures in the inlet and outlet sides of the hydraulically actuated device) without the need for separate “independent metering” valves. In other words, this configuration of the proportional control valve provides a simple and cheap valve arrangement for achieving “independent metering” functionality using a conventional type of proportional control valve (e.g. a conventional directional spool valve).

DETAILED DESCRIPTION

Figure 1:
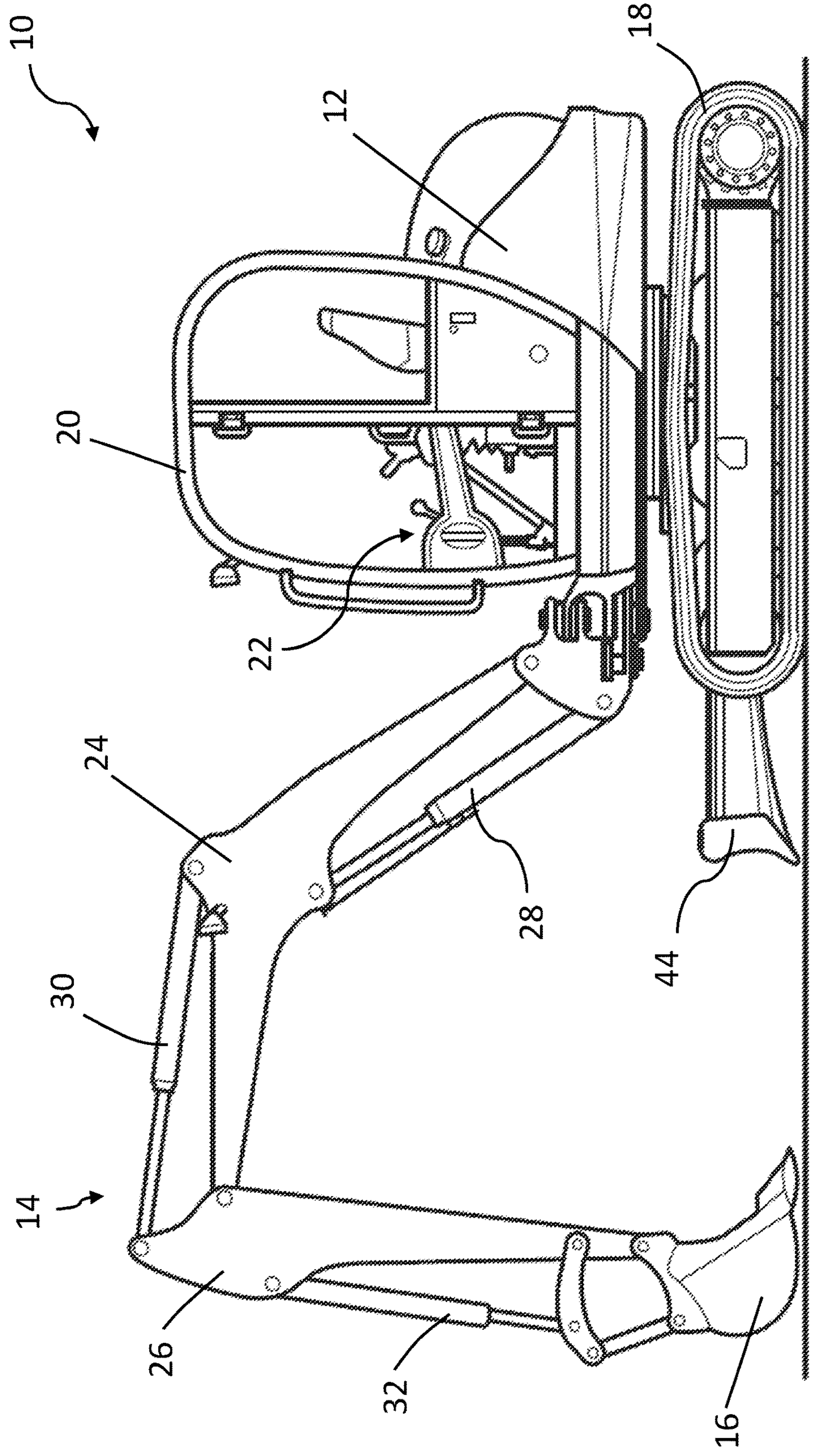
FIG. 1 is a side view of a working vehicle according to an embodiment.

Referring to FIG. 1, a working machine according to an embodiment is indicated at 10. The working machine 10 has a chassis 12, a working arm 14 attached to the chassis 12, and an implement 16 connected to a free end of the working arm 14. In the illustrated embodiment, tracks 18 are provided to move the working machine 10. In alternative embodiments, wheels are provided to move the working machine 10, instead of tracks 18.

The working machine 10 includes a cab 20 with a collection of controls 22 for moving the working arm 14, the tracks 18, or controlling other functions of the working machine 10.

The working arm 14 includes a boom 24 pivotally attached to the chassis 12, a dipper arm 26 pivotally attached to the boom 24, and an implement pivotally attached to the dipper arm 26. In the illustrated embodiment, the implement is a bucket 16, which is used for soil-shifting or materials handling operations (e.g. trenching, grading, and loading) and/or materials handling (e.g. depositing aggregate in trenches, lifting materials and placing them on an elevated platform). In alternative embodiments, the bucket 16 is removed and replaced with an alternative implement, such as a hydraulic hammer drill.

A boom actuator 28 is provided to move the boom 24 in an ascending direction and a descending direction. The working machine 10 also includes a dipper actuator 30, for pivoting the dipper arm 26 with respect to the boom 24, and a bucket actuator 32, for pivoting the bucket 16 with respect to the dipper arm 26.

Figure 2:
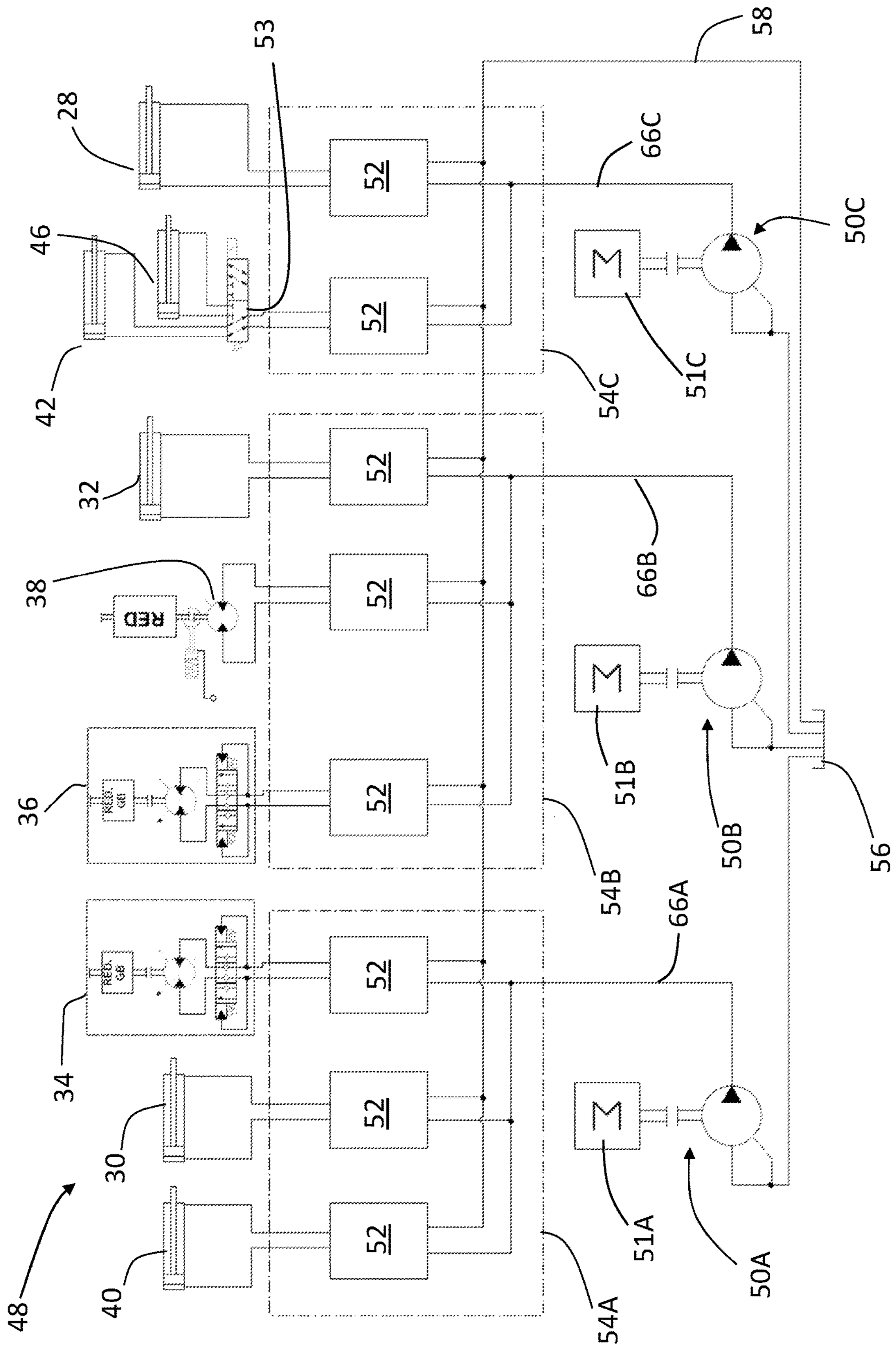
FIG. 2 is a schematic of a hydraulic system of the working vehicle of FIG. 1.

The working machine 10 also includes, shown in schematic form in FIG. 2 but not shown in FIG. 1: left and right track motors 34, 36 for moving the left and right tracks 18 forwards or backwards; a slew motor 38 for slewing the chassis 12 relative to the tracks 18; a swing actuator 40 for pivoting the working arm 14 about a vertical axis relative to the chassis 12; a dozer actuator 42 for actuating a dozer blade 44; and a track extend actuator 46 for varying a length of the tracks 18. In some embodiments, the working machine 10 also includes one or more auxiliary hydraulic ports (not shown).

In the illustrated embodiment, the working machine 10 is a slew excavator. In alternative embodiments, the working machine 10 is another type of working machine including one or more hydraulically actuated devices 28, 30, 32, 34, 36, 38, 40, 42, 46.

The working machine 10 also includes a hydraulic system for controlling the hydraulically actuated devices 28, 30, 32, 34, 36, 38, 40, 42, 46, which will be described in more detail in relation to FIGS. 2 to 6*b*.

In some embodiments, the working vehicle 10 is an electric working vehicle, a fuel cell powered working vehicle (e.g. a working vehicle including a hydrogen fuel cell) or hybrid working vehicle of the kind having an electric source of power and an alternative source of power. The aspects of the disclosure described below have been found to significantly reduce hydraulic system losses by up to 50% compared to traditional independent metering hydraulic systems. This leads to a proportionate reduction in battery energy consumption when the hydraulic system is used on an electric working vehicle 10, or a proportionate reduction in fuel consumption when the hydraulic system is used on a fuel cell powered working vehicle.

Referring now to FIG. 2, a hydraulic system for the working machine 10 of FIG. 1 is indicated at 48. The hydraulic system 48 is configured to supply hydraulic fluid to the hydraulically actuated devices 28, 30, 32, 34, 36, 38, 40, 42, 46.

As will be described in more detail below, the hydraulic system 48 includes a plurality of hydraulic pump assemblies 50A, 50B, 50C each for supplying a variable output of hydraulic fluid from a tank 56 to one or more hydraulically-actuated devices 28, 30, 32, 34, 36, 38, 40, 42, 46.

In the illustrated embodiment, each hydraulic pump assembly 50A, 50B, 50C is driven by a respective electric motor 51A, 51B, 51C, and the hydraulic system 48 is configured such that output of hydraulic fluid from each hydraulic pump assembly 50A, 50B, 50C is varied by adjusting the rotation speed of the associated electric motor 51A, 51B, 51C. This arrangement provides for simple and effective control of the output of hydraulic fluid from the hydraulic pump assemblies 50A, 50B, 50C. Furthermore, use of electric motors 51A, 51B, 51C to drive the hydraulic pump assemblies 50A, 50B, 50C is particularly beneficial when the working vehicle 10 is an electric working vehicle or fuel cell powered working vehicle without an internal combustion engine to provide a mechanical drive for the hydraulic pump assemblies 50A, 50B, 50C, or a hybrid working vehicle 10 in which an internal combustion engine is not operated continuously. In alternative embodiments, the hydraulic pump assemblies 50A, 50B, 50C are each driven by a mechanically-driven shaft (e.g. a shaft coupled to an internal combustion engine) and each include a variable displacement pump for varying an output of hydraulic fluid for the hydraulic pump assembly 50A 50B, 50C.

As will be described in more detail below, a first group of the hydraulically actuated devices 28, 30, 32, 34, 36, 38, 40, 42, 46 are actuated simultaneously to carry out a first set of functions of the working vehicle 10, and are not actuated in order to carry out a second set of functions of the working vehicle 10. The first group of hydraulically actuated devices includes the boom actuator 28, dipper actuator 30 and bucket actuator 32, and the first set of functions relates to movement of the working arm 14. For example, the first set of functions includes excavating material with the working arm 14; raising/lowering the working arm 14; slewing the working arm 14 about a vertical axis; and/or dumping excavated material from the working arm.

Referring to Table 1, an excavating function typically requires simultaneous actuation of the boom actuator 28 at a relatively low pressure, actuation of the dipper actuator 30 at relatively high pressure, and actuation of the bucket actuator 32 at a medium pressure. A combined lifting and slewing function typically requires simultaneous actuation of the boom actuator 28 at a relatively high pressure, actuation of the dipper actuator 30 at relatively a low pressure, and actuation of the slew motor 38 at a relatively high pressure. A dumping function typically requires simultaneous actuation of the boom actuator 28 at high pressure, actuation of the dipper actuator 30 at relatively low pressure, and actuation of the bucket actuator 32 at a relatively low pressure. A return-to-trench function (i.e. after dumping an excavated load) typically requires simultaneous actuation of the boom actuator 28 and dipper actuator 30 at relatively low pressures, and actuation of the slew motor 38 at a medium pressure.

It will be understood that Table 1 only indicates typical pressure ranges, and that the actuation pressure of hydraulically actuated devices 28, 30, 32, 34, 36, 38, 40, 42, 46 may vary throughout a working machine function based on dynamics of the system. For example, while slew motor 38 operates at high pressure during an accelerating slewing motion, the pressure will lower if a constant velocity slewing motion is achieved.

actuated devices 28, 30, 32 of the first group is supplied by a different hydraulic pump assembly 50A, 50B, 50C. The hydraulic system 48 is also arranged so that each of the hydraulically actuated devices 34, 36, 42 of the second group is supplied by a different hydraulic pump assembly 50A, 50B, 50C. This effectively de-couples hydraulically actuated devices which are typically actuated simultaneously, because they are supplied by different hydraulic pump assemblies.

However, it will be understood that such an architecture of the hydraulic system 48 does not preclude simultaneous actuation of hydraulically actuated devices from the first and second groups. For example, it would still be possible to carry out a third set of non-typical functions in which the

TABLE 1

An overview of working machine functions and relative actuation pressures of associated hydraulically actuated devices

| | Pump Assembly | First (50A) | | Second (50B) | | Third (50C) | | |
|---|---|---|---|---|---|---|---|---|
| | Group | 1 | 2 | 1 | 2 | 1 | 1 | 2 |
| | Hydraulically Actuated Device | Boom (28) | Dozer (42) | Dipper (30) | Left Track (34) | Bucket (32) | Slew (38) | Right track (36) |
| First set of functions | Excavate | LOW | | HIGH | | MEDIUM | | |
| | Lift and Slew | HIGH | | LOW | | | HIGH | |
| | Dump | HIGH | | LOW | | LOW | | |
| | Return to Trench | LOW | | LOW | | | MEDIUM | |
| Second set of functions | Travel | | | | MEDIUM | | | MEDIUM |
| | Levelling with Dozer | | LOW | | HIGH | | | HIGH |

As will also be described in more detail below, a second group of the hydraulically actuated devices 28, 30, 32, 34, 36, 38, 40, 42, 46 are actuated simultaneously to carry out the second set of functions of the working vehicle 10, and are not actuated in order to carry out the first set of functions of the working vehicle 10. The second group of hydraulically actuated devices includes the left and right track motors 34, 36, and the second set of functions relates to movement of the chassis 12. For example, the second set of functions includes moving the chassis 12 forward or backwards in a straight line or curved path, or rotating the chassis 12 about a vertical axis (e.g. by rotating the left and right tracks 18 in opposite directions).

In the illustrated embodiment, the second group of hydraulically actuated devices also includes the dozer actuator 42, and the second set of functions also includes levelling material with the dozer blade 44 (e.g. by moving the chassis 12 whilst simultaneously actuating the dozer blade 44).

Referring again to Table 1, a travelling function typically requires simultaneous actuation of the left and right track motors 34, 36 at medium pressure. A levelling function with the dozer blade 44 typically requires simultaneous actuation of the dozer actuator 42 at a relatively low pressure, and actuation of the left and right track motors 34, 36 at a relatively high pressure.

It will be understand that the actuation pressure of the different actuators will vary depending on the design of the working machine 10 and hydraulic system 48. For example, in some embodiments, relatively high pressures are in the range of 100 to 250 Bar, relatively low pressures are in the range of 0 to 50 Bar, and medium pressures are between these ranges (i.e. in the range of 50 to 100 Bar). These example pressure ranges are for a small midi excavator. It will be understood that larger excavators or other working vehicles may operate at higher pressures.

As will be described in more detail below, the hydraulic system 48 is arranged so that each of the hydraulically chassis 12 and working arm 14 are moved simultaneously (e.g. when spreading excavated material by dumping with the working arm 14 whilst moving the chassis 12 with the tracks 18).

In some embodiments, at least one of the hydraulic pump assemblies 50A, 50B, 50C is arranged for supplying hydraulic fluid to both a hydraulically actuated device 28, 30, 32 of the first group and a hydraulically actuated device 34, 36, 42 of the second group.

In the embodiment illustrated in FIG. 2, the hydraulic system 48 includes three hydraulic pump assemblies 50A, 50B, 50C each for supplying a variable output of hydraulic fluid from the tank 56 to two or more of the hydraulically actuated devices 28, 30, 32, 34, 36, 38, 40, 42, 46. In other words, each of the hydraulic pump assemblies 50A, 50B, 50C is a shared pump assembly. Sharing pump flow between some hydraulically actuated devices (e.g. devices which typically operate under similar load pressures) results in a cheaper/smaller pump system than if a dedicated hydraulic pump assembly is provided for each hydraulically actuated device.

However, in alternative embodiments, a dedicated hydraulic pump assembly is provided for each hydraulically actuated device 28, 30, 32, 34, 36, 38, 40, 42, 46 (i.e. the number of hydraulic pump assemblies is equal to the number of hydraulically actuated devices 28, 30, 32, 34, 36, 38, 40, 42, 46). In alternative embodiments, more or fewer than three hydraulic pump assemblies are provided. In alternative embodiments, some of the hydraulic pump assemblies are shared pump assemblies supplying two or more devices, and some of the hydraulic pump assemblies are dedicated hydraulic pump assemblies supplying a single hydraulically actuated device.

In some embodiments, the hydraulic system 48 is configured so that each of the shared pump assemblies 50A, 50B, 50C supplies hydraulic fluid to two or more hydraulically actuated devices 28, 30, 32, 34, 36, 38, 40, 42, 46 simultaneously, as will be described in more detail below. In alternative embodiments, the hydraulic system 48 is configured so that each of the shared pump assemblies 50A, 50B and 50C only supplies hydraulic fluid to a single hydraulically actuated device 28, 30, 32, 34, 36, 38, 40, 42, 46 at any instant of time.

In the illustrated embodiment, the first hydraulic pump assembly 50A supplies hydraulic fluid to the swing actuator 40, dipper actuator 30 and left hand track motor 34; the second hydraulic pump assembly 50B supplies hydraulic fluid to the right hand track motor 36, slew motor 38, and bucket actuator 32; and the third hydraulic pump assembly 50C supplies hydraulic fluid to the dozer actuator 42, track extend actuator 46 and boom actuator 28.

Such a hydraulic system configuration has been found to be a particularly efficient way of de-coupling those of hydraulically actuated devices 28, 30, 32, 34, 36, 38, 40, 42, 46 which are typically actuated simultaneously, and thus reducing the hydraulic system efficiency losses associated with parallel flows of hydraulic fluid driven by a shared pump assembly 50A, 50B, 50C. Furthermore, those of hydraulically actuated devices 28, 30, 32, 34, 36, 38, 40, 42, 46 which are driven by a shared pump assembly of this configuration typically operate at similar load pressures, which allows optimal sizing of each hydraulic pump assembly 50A, 50B, 50C, and reduces the amount of restriction/compensation required to split the flow when multiple devices are actuated by a shared pump assembly simultaneously (as described in more detail below).

Left and right track motors 34, 36 are commonly used in tandem on a working vehicle 10 (e.g. when moving the working vehicle 10 in a straight line). Therefore, having the left and right track motors 34, 36 supplied by different hydraulic pump assemblies 50A, 50B provides for independent straight line tracking control and reliable movement of the working vehicle 10. Similarly, a boom actuator 28, dipper arm actuator 30 and bucket actuator 32 are commonly used in tandem on a working vehicle 10 (e.g. when moving the working arm 14). Therefore, having the boom actuator 28, dipper actuator 30 and bucket actuator 32 supplied by different hydraulic pump assemblies 50A, 50B, 50C provides for independent working arm limb control and reliable movement of the working arm 14.

Conversely, track motors 34, 36 are not regularly used in tandem with working arm actuators 28, 30, 32 of a working vehicle 10. For example, most commonly, a working vehicle 10 moves with the working arm 14 stationary, or the working vehicle 10 is stationary whilst moving the working arm 14. Therefore, supplying a track motor 34, 36 and a working arm actuator 28, 30, 32 with hydraulic fluid from the same hydraulic pump assembly 50A, 50B is less likely to result in parallel losses associated with shared pump flow than if devices which are typically actuated together share a common hydraulic pump assembly.

In other words, those of hydraulically actuated devices 28, 30, 32, 34, 36, 38, 40, 42, 46 which are typically actuated together are effectively de-coupled because they are supplied by different hydraulic pump assemblies.

Nevertheless, in operating conditions where a track motor 34, 36 and working arm actuator 28, 30, 32 are actuated simultaneously (e.g. during a grading operation), such a hydraulic system configuration still permits simultaneous actuation via control of respective pressure compensators 70 (as discussed below in relation to FIG. 3) to share the flow of hydraulic fluid from the shared pump assembly.

The hydraulic system 48 also includes a plurality of proportional control valves 52 which are each connected to a respective hydraulically-actuated device 28, 30, 32, 34, 36, 38, 40, 42, 46. The hydraulic system 48 is arranged so that hydraulic fluid exiting each of the hydraulically actuated devices 28, 30, 32, 34, 36, 38, 40, 42, 46 flows through a first restriction of a respective proportional control valve 52 before returning to the tank 56 via a tank line 58.

In the illustrated embodiment, the boom actuator 28, dipper actuator 30, bucket actuator 32, left track motor 34, right track motor 36, slew motor 38 and swing actuator 40 are each connected to a dedicated proportional control valve 52. In contrast, the dozer actuator 42 and track extend actuator 46 are connected to a common proportional control valve 52 via a switching valve 53. The switching valve 53 has a first state which connects the dozer actuator 42 to the associated proportional control valve 52, and a second state which connects the track extend actuator to the associated proportional control valve 52. Such a switching arrangement is suitable when multiple hydraulically actuated devices will never be actuated simultaneously (e.g. actuation of the dozer blade 44 and extension of the tracks 18). The switching arrangement also reduces the required number of proportional control valves 52 which are comparatively more expensive/complex than switching valves. However, it will be understood that wherever hydraulically actuated devices may need to be actuated simultaneously, they will be connected to independent proportional control valves 52.

Figure 3:
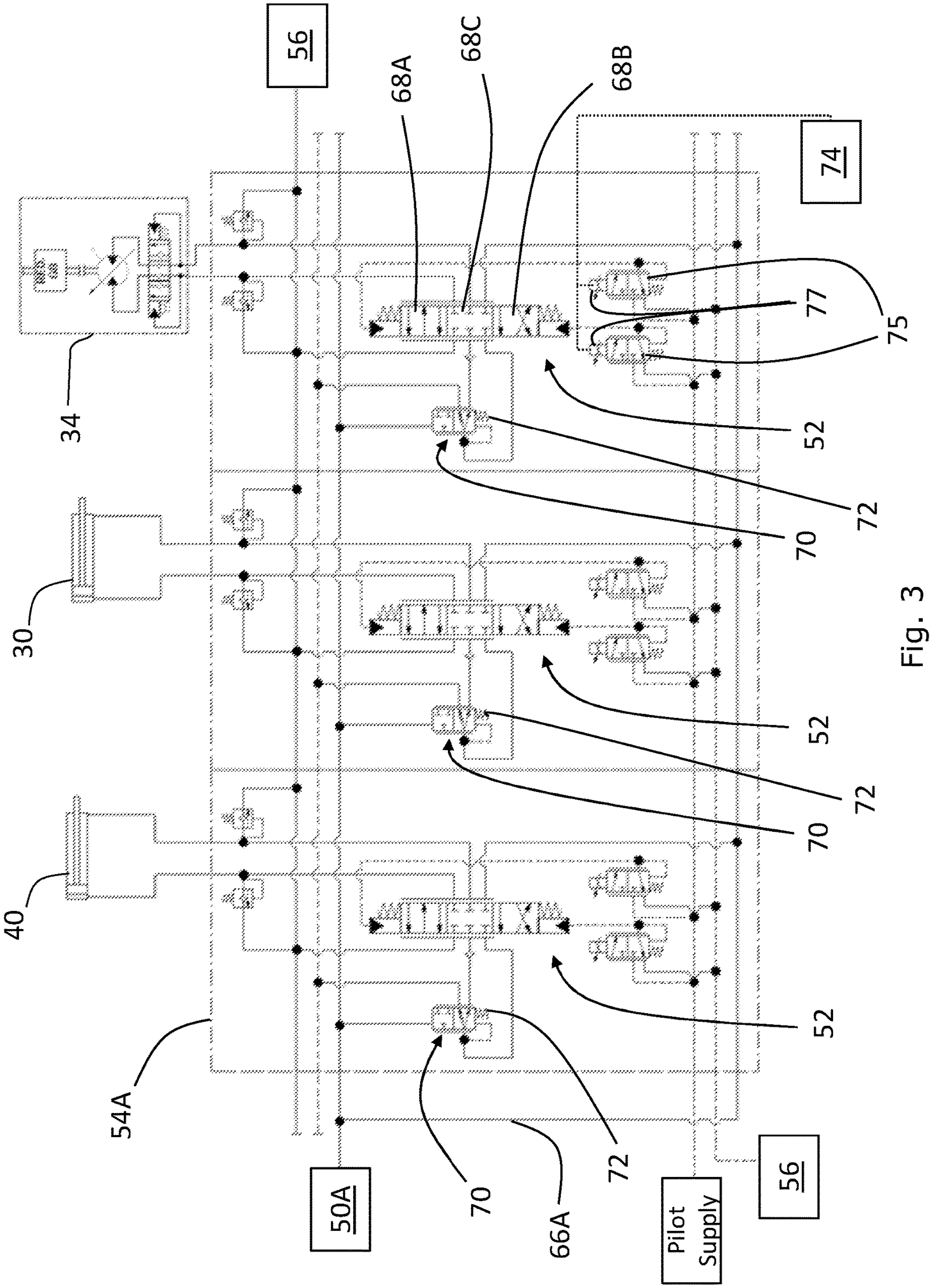
FIG. 3 is a detailed schematic of a valve group of the hydraulic system of FIG. 2.

In the illustrated embodiment, there are three valve groups 54A, 54B, 54C which each receive hydraulic fluid from a respective one of the three hydraulic pump assemblies 50A, 50B, 50C. Each of the proportional control valves 52 is part of one of the valve groups 54A, 54B, 54C. For simplicity, the valve groups 54A, 54B, 54C and proportional control valves 52 are shown schematically in FIG. 2. Specific details of valve group 54A and the proportional control valves 52 are shown in FIG. 3, as discussed below.

The hydraulic system 48 is configured to control a flow of hydraulic fluid supplied to each hydraulically actuated device 28, 30, 32, 34, 36, 38, 40, 42, 46 by varying the output of hydraulic fluid from the hydraulic pump assemblies 50A, 50B, 50C. The hydraulic system 48 is also configured to control a flow of hydraulic fluid exiting each of the hydraulically actuated device 28, 30, 32, 34, 36, 38, 40, 42, 46 by adjusting a restriction area of the respective proportional control valves 52, as will be described in more detail below.

The hydraulic system 48 is configured so that restriction of the proportional control valves 52 is controlled independently to the output from the hydraulic pump assemblies 50A, 50B, 50C. The restriction of the proportional control valves 52 being controlled independently to the output from the hydraulic pump assemblies 50A, 50B, 50C allows the pressure of an inlet side of a hydraulically actuated device 28, 30, 32, 34, 36, 38, 40, 42, 46 to be controlled separately to the pressure of an outlet side of the hydraulically actuated device 28, 30, 32, 34, 36, 38, 40, 42, 46, which has been found to improve system controllability and increase efficiency of the hydraulic system 48.

Figure 4:
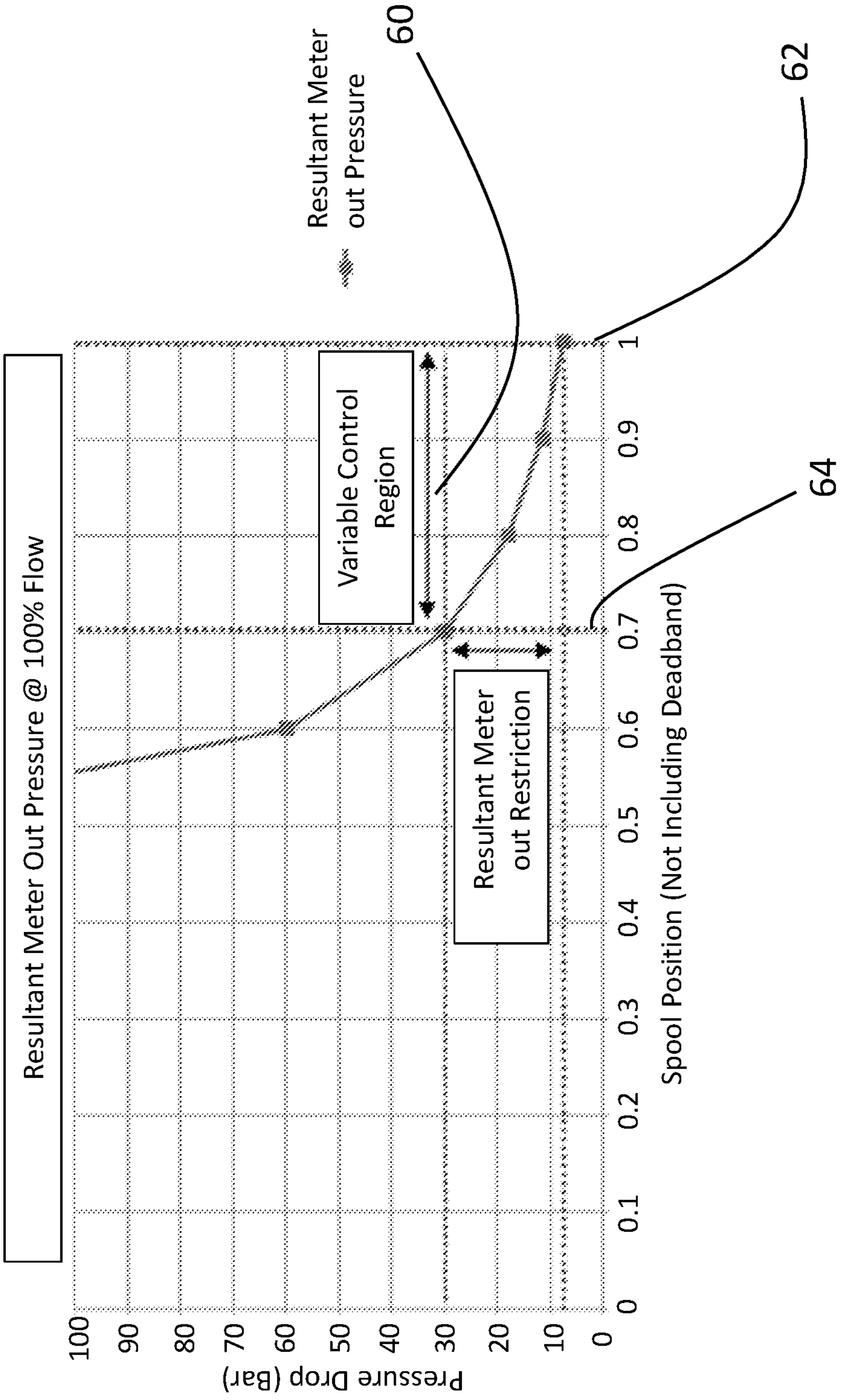
FIGS. 4 and 5 are graphs representing characteristics of the proportional control valves of FIGS. 2 and 3.

Referring to FIG. 4, each of the proportional control valves 52 is moveable within a first opening range 60 between a first opening position 62 and a second opening position 64. Each of the proportional control valves 52 defines a first flow path through which a flow of hydraulic fluid from a respective hydraulically actuated device 28, 30, 32, 34, 36, 38, 40, 42, 46 flows. The proportional control valves 52 are each configured so that a size of a restriction area of the first flow path decreases as the proportional control valve 52 is moved from the first opening position 62 to the second opening position 64 in order to increase a pressure of hydraulic fluid in an outlet side of the respective hydraulically actuated device 28, 30, 32, 34, 36, 38, 40, 42, 46.

Figure 5:
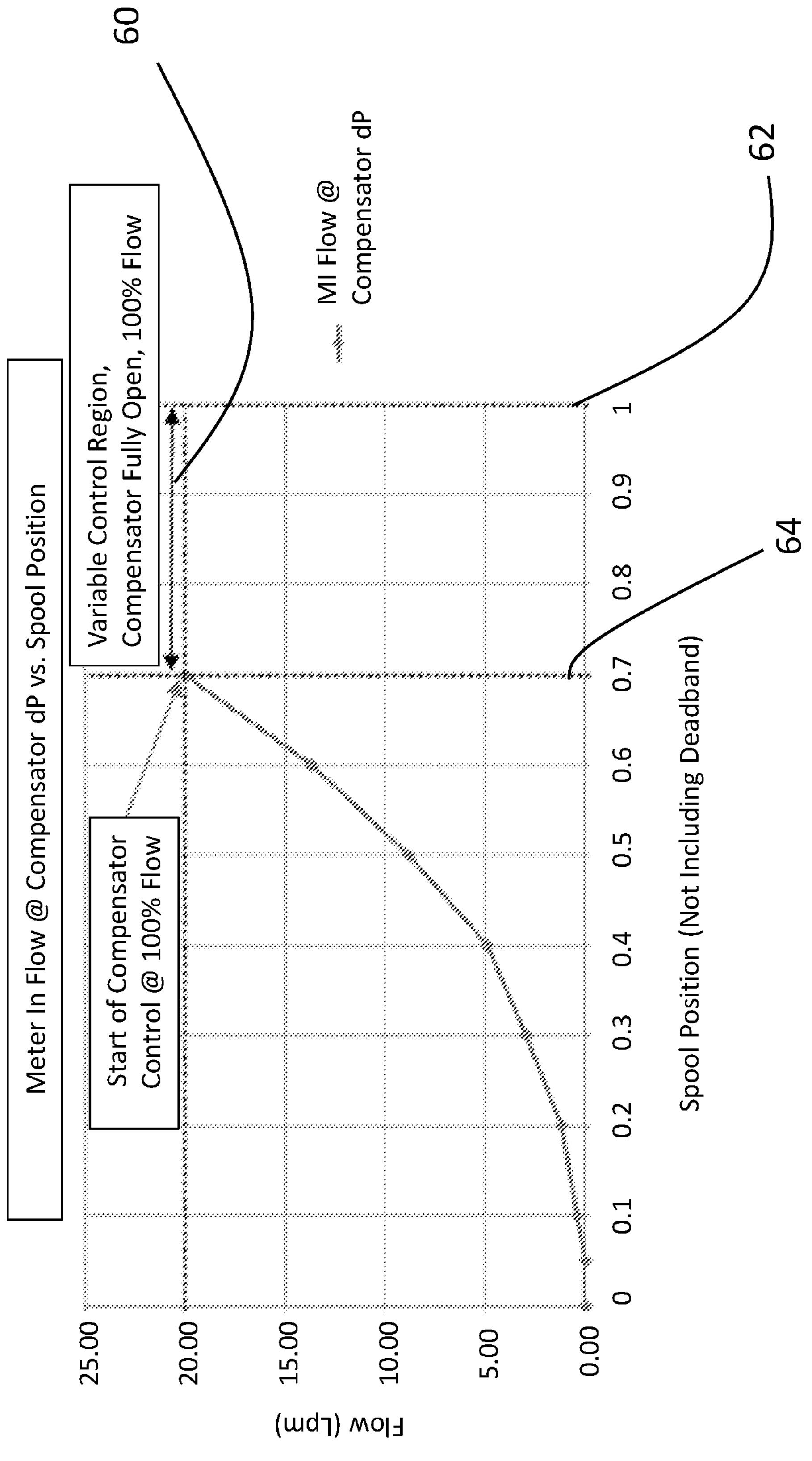

Referring to FIG. 5, each of the proportional control valves 52 also defines a second flow path and the hydraulic system 48 is arranged such that the proportional control valves 52 each connect one of the hydraulic pump assemblies 50A, 50B, 50C to a respective hydraulically actuated device 28, 30, 32, 34, 36, 38, 40, 42, 46 so that hydraulic fluid supplied by said one of the hydraulic pump assemblies 50A, 50B, 50C to said hydraulically actuated device 28, 30, 32, 34, 36, 38, 40, 42, 46 flows through the second flow path. In other words, each of the proportional control valves 52 is arranged so that the second flow path is provided between one of the hydraulically actuated devices 28, 30, 32, 34, 36, 38, 40, 42, 46 and a hydraulic supply line 66A, 66B, 66C connected to a respective hydraulic pump assembly 50A, 50B, 50C.

Each of the proportional control valves 52 is configured so that a pressure differential across a restriction area of the second flow path is less than 10% of a maximum system pressure when the opening position of the proportional control valve is within said first opening range. For example, when the maximum system pressure is 230 bar, the pressure differential across the restriction area of the second flow path is less than 23 bar when the opening position of the proportional control valve 52 is within the first opening range 60. In some embodiments, the pressure differential across the restriction area of the second flow path is in the range of 0.5 bar to 4 bar (e.g. 1 bar) when the proportional control valve 52 is at the first opening position 62, and the pressure differential across the restriction area of the second flow path is in the range of 5 bar to 10 bar (e.g. 7 bar) when the proportional control valve 52 is at the second opening position 64.

It will be understood that the first opening ranges 60 of the proportional control valves 52 differ depending on the output of hydraulic fluid from the associated hydraulic pump assembly 50A, 50B, 50C. For example, at 100% of the maximum flow rate of the associated hydraulic pump assembly 50A, 50B, 50C, the first opening range 60 may span from a first opening position 62 of 100% of the maximum restriction area of the second flow path to a second opening position 64 of 70% of the maximum restriction area of the second flow path. For the same hydraulic system at 50% of the maximum flow rate of the associated hydraulic pump assembly 50A, 50B, 50C, the first opening range 60 may span from a first opening position 62 of 100% of the maximum restriction area of the second flow path to a second opening position 64 of around 53% of the maximum restriction area of the second flow path. In alternative embodiments, the second opening position 64 differs from those outlined above (e.g. greater or less than 70% of the maximum restriction area at 100% flow rate, and greater or less than 53% of the maximum restriction area at 50% flow rate). In any case, for a given hydraulic system configuration, the second opening position 64 which defines the bottom of the first opening range 60 will be lower when the flow rate of fluid supplied by the associated hydraulic pump assembly 50A, 50B, 50C is lower.

It will be understood that each of the proportional control valves 52 may also be set to an opening position outside the first opening range 60, in order to further reduce the size of the restriction areas of the first and second flow paths to a fully closed position. In other words, the proportional control valves 52 are moveable within a second opening range between the second opening position 64 and a closed position.

Referring now to FIG. 3, each of the proportional control valves 52 is a directional proportional control valve. In other words, each of the proportional control valves 52 has: a first state 68A for driving an associated hydraulically actuated device 28, 30, 32, 34, 36, 38, 40, 42, 46 in a first direction (e.g. an extending direction of a hydraulic cylinder); a second state 68B for driving the associated hydraulically actuated device 28, 30, 32, 34, 36, 38, 40, 42, 46 in a second direction (e.g. a retracting direction of a hydraulic cylinder); and a neutral state 68C for blocking a flow of hydraulic fluid to/from the associated hydraulically actuated device 28, 30, 32, 34, 36, 38, 40, 42, 46. As such, each of the first and second states 68A and 68B includes a first flow path (connected to tank line 58) and second flow path (connected to an associated supply line 66A, 66B, 66C) which are sized to provide the behaviour described above in relation to FIGS. 4 and 5.

The proportional control valves 52 being directional proportional control valves allows the hydraulically actuated devices 28, 30, 32, 34, 36, 38, 40, 42, 46 to be actuated in two directions (e.g. extension/retraction of a hydraulic cylinder, or clockwise/anti-clockwise rotation of a hydraulic motor) by changing the direction of the directional proportional control valve 52. This removes the need for additional control valves to change an actuation direction of the hydraulically actuated devices 28, 30, 32, 34, 36, 38, 40, 42, 46.

However, in alternative embodiments the proportional control valves 52 are not directional control valves. For example, in some embodiments two separate proportional control valves 52 are provided for each hydraulically actuated device 28, 30, 32, 34, 36, 38, 40, 42, 46, the two separate proportional control valves 52 being configured to move the associated hydraulically actuated device 28, 30, 32, 34, 36, 38, 40, 42, 46 in different directions.

The hydraulic system 48 also includes a plurality of pressure compensators 70. The number of pressure compensators 70 corresponds to the number of proportional control valves 52 which are connected to a shared pump assembly 50A, 50B, 50C. For example, in the valve group 54A illustrated in FIG. 3, there are three proportional control valves 52 connected to the hydraulic supply line 66A and three associated pressure compensators 70. In other words, each of the hydraulically actuated devices 30, 34, 40 supplied by the shared pump assembly 50A is connected to the shared pump assembly 50A via a respective pressure compensator 70. The pressure compensators 70 are arranged to restrict flow into their respective hydraulically actuated devices 30, 34, 40 to control a share of the flow of hydraulic fluid supplied by the shared pump assembly 50A between multiple hydraulically actuated devices 30, 34, 40.

In the illustrated embodiment, each of pressure compensators 70 is of the type commonly referred to as a "pre-compensator", whereby the pressure compensator 70 is provided between the hydraulic pump assembly 50A and the associated proportional control valve 52. A compensator opening area of each pressure compensator 70 is controlled by a pressure differential across the associated proportional control valve 52 (which is proportional to the flow passing across the restriction area of the second flow path of the proportional control valve 52) and is biased open by a spring 72.

When said pressure differential across the associated proportional control valve 52 reaches a set value of the spring 72, a size of the compensator opening area is reduced to the point where it begins generate additional restriction to the flow of hydraulic fluid from the hydraulic pump assembly 50A to the associated hydraulically actuated device 30, 34, 40. If the pressure differential across the associated proportional control valve 52 increases further, the size of the compensator opening area is reduced further restrict the flow of hydraulic fluid from the hydraulic pump assembly 50A to the associated hydraulically actuated device 30, 34, 40. Each pressure compensator 70 is designed with a 'gain' to define the amount of additional restriction generated by the compensator opening area for a given pressure differential across the associated proportional control valve 52, and thus how aggressively the flow of hydraulic fluid from the hydraulic pump assembly 50A to the associated hydraulically actuated device 30, 34, 40 is controlled with varying pressure levels.

In some embodiments, each proportional control valve 52 is designed so that when its opening position is within the first opening range 60, the pressure differential across the restriction area of the second flow path of the proportional control valve 52 is less than the set value of the spring 72 of the associated pressure compensator 70. In this way, the compensator opening of the pressure compensator 70 is held fully open and has no restrictive effect when the opening position of the associated proportional control valve 52 is within the first opening range 60.

In some embodiments, the set value of each spring is in the range of 2 to 15 bar or in the range of 5 to 10 bar (e.g. 7 bar).

When only one of the hydraulically actuated devices 30, 34, 40 is operated, an opening position of the associated proportional control valve 52 will be within the first opening range 60. In this way, the associated pressure compensator 70 is fully open and a flow of hydraulic fluid into the hydraulically actuated device 30, 34, 40 is controlled by varying the output of hydraulic fluid from the hydraulic pump assembly 50A. In other words, the pressure compensator 70 and restriction area of the second flow path of the proportional control valve 52 do not have a significant effect on the flow of hydraulic fluid entering the hydraulically actuated device 30, 34, 40.

When multiple hydraulically actuated devices 30, 34, 40 are operated simultaneously, the opening position of the associated proportional control valves 52 is set to a value outside the first opening range so that the associated pressure compensators 70 restrict a flow of hydraulic fluid to the hydraulically actuated devices 30, 34, 40 which are being operated. In a conventional manner, the pressure compensators 70 therefore share a flow of hydraulic fluid from the hydraulic pump assembly 50A between the hydraulically actuated devices 30, 34, 40, by preventing excess flow passing to a hydraulically actuated device operating at a lower pressure than other hydraulically actuated devices operating at a higher pressure.

In order to control the amount of compensation provided by the pressure compensators 70 so that certain hydraulically actuated devices 30, 34, 40 take priority over others, the proportional control valve 52 associated with a higher priority hydraulically actuated device 30, 34, 40 is set to an opening position just within the first opening range 60 (e.g. slightly above the second opening position 64). In this way, an additional flow can pass through the proportional control valve 52 before the associated compensator 70 begins to operate, giving priority to the associated hydraulically actuated device 30, 34, 40.

In alternative embodiments, the pressure compensators 70 are of the type commonly known as "post-compensators". In such embodiments, the opening position of the pressure compensators 70 are each controlled by the load pressure of the associated hydraulically actuated device 30, 34, 40. The pressure compensators 70 artificially raise pressure downstream of the associated proportional control valves 52 to achieve an equal pressure differential across all proportional control valves 52. In a post compensated system, the restriction areas of the first and second flow paths of the proportional control valves 52 would be designed as described above, but the requirement to design the first opening range 60 around the set value of the springs 72 is removed. Instead, the proportional control valves 52 would be designed so that a pressure differential across the proportional control valves 52 is set to a level that gives acceptable accuracy of the associated pressure compensator (e.g. 5 bar) when the proportional control valve is outside the first opening range 60.

The hydraulic system 48 includes a control system 74 configured to control the flow rate and/or pressure of hydraulic fluid flowing through the hydraulic system 48. In the illustrated embodiment, the control system is configured to set the opening position of the proportional control valves 52 by varying a pressure of pilot fluid supplied from a pilot supply to first and second pressure ports of the proportional control valves 52 (e.g. by controlling solenoids 77 which alter the position of pilot valves 75, as illustrated in FIG. 3). In alternative embodiments, the proportional control valves 52 are solenoid valves controlled directly by the control system 74, rather than via a pilot pressure.

The control system 74 is also configured to control the output of the hydraulic pump assemblies 50A, 50B, 50C (e.g. by setting a rotation speed of electric motors 51A, 51B, 51C illustrated in FIG. 2).

As will be described in more detail below, the control system 74 is configured to determine a loading condition of each hydraulically actuated device 28, 30, 32, 34, 36, 38, 40, 42, 46.

In some embodiments, the control system 74 is configured to determine such loading conditions via open-loop estimation. For example, in some embodiments the control system 74 is configured to estimate the loading conditions of the hydraulically actuated devices 28, 30, 32, 34, 36, 38, 40, 42, 46 through use of a look-up table of typical loading conditions (e.g. similar to those indicated in Table 1 and described above). Alternatively, the control system 74 may be configured to estimate the loading conditions based on a position of one or more user inputs (e.g. joysticks, levers, pedals, or the like).

In some embodiments, the control system 74 is configured to determine the loading conditions via feedback based on measurements indicative of the loading conditions.

For example, in some embodiments the hydraulic system 48 includes one or more pressure transducers for measuring a pressure of hydraulic fluid supplied by the hydraulic pump assemblies 50A, 50B, 50C (e.g. one pressure transducer per pump assembly) and the control system 74 is configured to determine the loading conditions as a function of the measured pressures of hydraulic fluid supplied by the hydraulic pump assemblies 50A, 50B, 50C.

In alternative embodiments, the hydraulic system 48 includes one or more pressure transducers for measuring a pressure of hydraulic fluid entering or leaving each of the hydraulically actuated devices (e.g. a pair of pressure transducers for each of the hydraulically actuated devices 28, 30, 32, 34, 36, 38, 40, 42, 46) and the control system 74 is configured to determine the loading conditions directly based on the measured pressures.

In alternative embodiments, the hydraulic system 48 includes one or more force sensors for measuring a force acting on the hydraulically actuated devices 28, 30, 32, 34, 36, 38, 40, 42, 46 (e.g. a force sensor per hydraulically actuated device 28, 30, 32, 34, 36, 38, 40, 42, 46) and the control system 74 is configured to determine the loading as a function of the measured forces.

In alternative embodiments, the hydraulic system 48 includes one or more position sensors for measuring positions of the hydraulically actuated devices 28, 30, 32, 34, 36, 38, 40, 42, 46 and/or other elements of the working machine 10 (e.g. boom 24, dipper arm 26, implement 16) and the control system 74 is configured to determine the loading conditions as a function of the measured positions.

In some embodiments, the control system 74 determines the loading conditions via an alternative means to those described above. In some embodiments, two or more of the means for determining the loading conditions described above are combined to increase the accuracy of the loading condition determination.

As will be described in more detail below, after determining the loading conditions the control system 74 is configured to adjust the restriction area of the respective proportional control valves 52 in order to inhibit cavitation of the hydraulically actuated devices 28, 30, 32, 34, 36, 38, 40, 42, 46.

A method of controlling the hydraulic system 48 outlined above will now be described in relation to FIG. 6.

In the illustrated embodiment, the control system 74 is configured to set an output command of the hydraulic pump assemblies 50A, 50B, 50C. For example, at step S12 the control system 74 is configured to calculate a target velocity for each hydraulically actuated device 28, 30, 32, 34, 36, 38, 40, 42, 46 based on one or more user inputs 22 of the working vehicle 10, and set a flow command for each hydraulic pump assembly 50A, 50B, 50C based on the target velocities (steps S14 and S16). In this way, a pump flow required to move a hydraulically actuated device 28, 30, 32, 34, 36, 38, 40, 42, 46 at a required speed is set directly by the control system 74, which removes the need for flow of hydraulic fluid from the pump assemblies 50A, 50B, 50C to be restricted (when devices are not being actuated simultaneously) and increases efficiency of the hydraulic system 48.

In the illustrated embodiment, the control system 74 is configured to set an opening position command for each proportional control valve 52 to vary the restriction areas of the first and second flow paths of each proportional control valve 52.

In the illustrated embodiment, the control system 74 is configured to do the following:

- monitor a loading condition of the hydraulically actuated devices 28, 30, 32, 34, 36, 38, 40, 42, 46;
- compare each of said monitored loading conditions against a respective loading condition threshold;
- when one of said monitored loading conditions is less than its respective loading condition threshold, set an opening position command to decrease the restriction area of the first flow path of the respective proportional control valve 52; and
- when one of said monitored loading conditions is greater than its respective loading condition threshold, set an opening position command to increase the restriction area of the first flow path of the respective proportional control valve 52.

In particular, the control system 74 is configured to do the following:

- monitor a pressure of hydraulic fluid supplied by each hydraulic pump assembly 50A, 50B, 50C (step S10);
- compare each of the monitored pressures against a respective pressure threshold (steps S22, S24, S26);
- when one of the monitored pressures is less than its respective pressure threshold, set an opening position command to decrease the restriction area of the first flow path of the respective proportional control valve 52 (step S32); or
- when one of said monitored pressures is greater than its respective pressure threshold, set an opening position command to increase the restriction area of the first flow path of the respective proportional control valve 52 (step S30).

If the pump pressure is much greater than the target pressure (as calculated at step S22), the proportional control valve 52 even at maximum opening position will still restrict valve area to a certain extent to maintain good back pressure on the hydraulically actuated device (step S28).

If the pump pressure matches the target pressure exactly, the opening position of the associated proportional control valve 52 is held at its current position (step S34).

In some embodiments, the control system 74 is further configured to filter pressure signals indicative of the pressure of hydraulic fluid supplied by the or each hydraulic pump assembly 50A, 50B, 50C (at step S10). This has been found to increase the stability of the control system 74.

In some embodiments, the control system 74 is further configured to set an opening position of each pressure compensator 70 to vary a restriction area of said pressure compensator 70 in order to control a share of flow of hydraulic fluid supplied by a shared pump assembly 50A, 50B, 50C between multiple hydraulically actuated devices 28, 30, 32, 34, 36, 38, 40, 42, 46 (at step S36).

In some embodiments, the control system 74 is configured to determine a required opening position of each pressure compensator 70 based on the operating conditions of its associated hydraulic pump assembly 50A, 50B, 50C and proportional control valve 52 (step S36).

When the calculations above indicate the proportional control valve 52 needs to change opening position, the proportional control valve 52 is moved to the new target position at step S38.

The hydraulic system 48 described above has been found to significantly reduce hydraulic system losses by up to 50% compared to traditional independent metering hydraulic systems.

A proportional control valve according to an embodiment will now be described in more detail. The proportional control valve 52 includes a pump port for receiving hydraulic fluid from a hydraulic pump (e.g. a pump of the hydraulic pump assemblies 50A, 50B, 50C of the hydraulic system 48 of FIGS. 2 to 5); and a tank port for supplying hydraulic fluid to a tank (e.g. the tank 56 of the hydraulic system of FIGS. 2 to 5). The proportional control valve 52 also includes first and second actuator ports for supplying hydraulic fluid to a hydraulically actuated device or receiving hydraulic fluid from a hydraulically actuated device (e.g. one of the hydraulically actuated devices 28, 30, 32, 34, 36, 38, 40, 42, 46 of the hydraulic system 48 described above).

The proportional control valve 52 defines a first flow path through which a flow of hydraulic fluid from the first or second actuator ports flows to the tank port. The proportional control valve 52 also defines a second flow path through which a flow of hydraulic fluid from the pump port flows to the first or second actuator ports.

The proportional control valve 52 is moveable within a first opening range 60 between a first opening position 62 and a second opening position 64. It will be understood that the opening position of the proportional control valve 52 is continuously movable within the first opening range 60 (i.e. at the first opening position 62, the second opening position 64, or any opening position therebetween).

The proportional control valve 52 is configured so that the size of a restriction area of the first flow path decreases as the proportional control valve 52 is moved from the first opening position 62 to the second opening position 64 in order to increase a pressure differential between the first or second actuator port and the tank port.

The proportional control valve 52 is also configured so that a pressure differential across the restriction area of the second flow path is less than 10% of a maximum system pressure when the opening position of the proportional control valve 52 is within the first opening range 60. For example, when the maximum system pressure is 230 bar, the pressure differential across the restriction area of the second flow path is less than 23 bar when the opening position of the proportional control valve 52 is within the first opening range 60. In some embodiments, the pressure differential across the restriction area of the second flow path is in the range of 0.5 bar to 4 bar (e.g. 1 bar) when the proportional control valve 52 is at the first opening position 62, and the pressure differential across the restriction area of the second flow path is in the range of 5 bar to 10 bar (e.g. 7 bar) when the proportional control valve 52 is at the second opening position 64.

The proportional control valve 52 is also moveable within a second opening range between the second opening position and a closed position, and the proportional control valve 52 is configured so that the size of the restriction areas of the first and second flow paths decreases as the proportional control valve is moved from the second opening position to the closed position in order to increase the pressure differentials across the first and second flow paths.

The aspects of the disclosure described above have been found to significantly reduce hydraulic system losses by up to 50% compared to traditional independent metering hydraulic systems. This leads to a proportionate reduction in battery energy consumption when the hydraulic system is used on an electric working vehicle, or a proportionate reduction in fuel consumption when the hydraulic system is used on a fuel cell powered working vehicle.

It will be understood that the use of conventional proportional control valves 52 (i.e. directional spool valves) that are configured to operate as described above provides significant advantages over more complex/expensive "independent metering valves" with similar functionality.

Although the disclosure has been described in relation to one or more embodiments, it will be appreciated that various changes or modifications can be made without departing from the scope defined by the appended claims.

For example, in alternative embodiments, the pressure compensators 70 are omitted entirely. When flow sharing is required in such embodiments, the restriction areas of the first and second flow paths of the proportional control valves 52 can be adjusted directly to control the sharing of flow from the respective shared pump assembly 50A, 50B, 50C. In particular, the control system 74 implements a flow sharing strategy as follows. Typical load conditions for selected hydraulically-actuated devices 28, 30, 32, 34, 36, 38, 40, 42, 46 are taken from a look-up table. The required pressure differential for each hydraulically actuated device 28, 30, 32, 34, 36, 40, 42, 46 relative to the highest load pressure is calculated. The respective proportional control valves 52 are then actuated by the control system 74 so that the combined restriction of the respective first and second flow paths of the proportional control valves 52 creates the necessary pressure differential for each hydraulically actuated device 28, 30, 32, 34, 36, 40, 42, 46. Such a flow sharing strategy reduces the number of components (by omitting the pressure compensators 70 and associated hydraulic circuitry), which leads to reduced cost of the hydraulic system.

Figure 6:
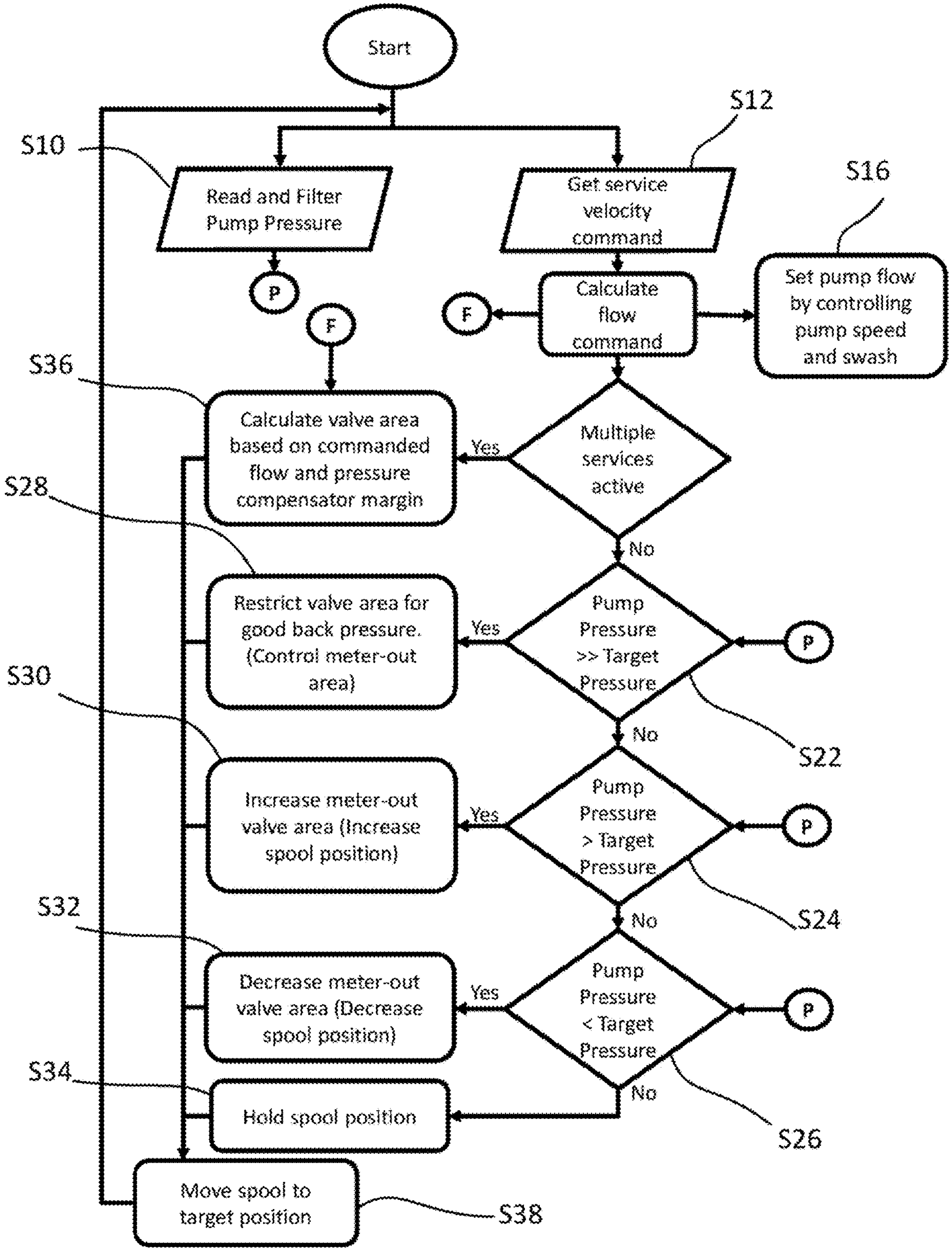
FIG. 6 is a flow chart for a method of controlling the hydraulic system of FIGS. 2 and 3.

It will be understood that in such an uncompensated hydraulic system embodiment, the control system 74 follows similar steps to those shown in the flow chart of FIG. 6, but that step S36 is replaced by the flow sharing strategy outlined above.

In further alternative embodiments, the slew motor 38 for slewing the chassis 12 relative to the tracks 18 is an electric motor rather than a hydraulic motor. An overview of the working machine functions and associated pressures for such an embodiment is outlined in Table 2 below. In contrast to Table 1 above, because the hydraulic slew motor 38 has been replaced with an electric slew motor, the third hydraulic pump assembly 50C only has one hydraulically actuated device assigned to the "Group 1" functions (the bucket actuator 32). In this way, when only "Group 1" functions are selected, no flow sharing would take place, which further increases the efficiency of the hydraulic system.

TABLE 2

An overview of working machine functions and relative actuation pressures of associated hydraulically actuated devices

| Pump Assembly | | First (50A) | | Second (50B) | | Third (50C) | |
|---|---|---|---|---|---|---|---|
| Group | | 1 | 2 | 1 | 2 | 1 | 2 |
| Hydraulically Actuated Device | | Boom (28) | Dozer (42) | Dipper (30) | Left Track (34) | Bucket (32) | Right track (36) |
| First set of functions | Excavate | LOW | | HIGH | | MEDIUM | |
| | Lift and Slew | HIGH | | LOW | | | |
| | Dump | HIGH | | LOW | | LOW | |
| | Return to Trench | LOW | | LOW | | | |
| Second set of functions | Travel | | | | MEDIUM | | MEDIUM |
| | Levelling with Dozer | | LOW | | HIGH | | HIGH |

It should also be noted that whilst the appended claims set out particular combinations of features described above, the scope of the present disclosure is not limited to the particular combinations hereafter claimed, but instead extends to encompass each feature herein disclosed in isolation, as well as any combination of features herein disclosed.

The invention claimed is:

1. A hydraulic system for a working vehicle, the hydraulic system comprising:

a hydraulically actuated device;

a hydraulic pump assembly for supplying a variable output of hydraulic fluid to the hydraulically actuated device;

a proportional control valve, wherein the hydraulic system is arranged such that hydraulic fluid exiting the hydraulically actuated device flows through a restriction of the proportional control valve; and wherein the hydraulic system is configured to control a flow of hydraulic fluid supplied to the hydraulically actuated device by varying the output of hydraulic fluid from the hydraulic pump assembly, and to control a flow of hydraulic fluid exiting the hydraulically actuated device via adjusting a restriction area of the proportional control valve;

wherein the proportional control valve is moveable within a first opening range between a first opening position and a second opening position, wherein the proportional control valve defines a first flow path through which a flow of hydraulic fluid from the hydraulically actuated device flows, and wherein the proportional control valve is configured so that a size of a restriction area of the first flow path decreases as the proportional control valve is moved from the first opening position to the second opening position in order to increase a pressure of hydraulic fluid in an outlet side of the hydraulically actuated device; and wherein the proportional control valve defines a second flow path, and wherein the hydraulic system is arranged such that the proportional control valve connects the hydraulic pump assembly to the hydraulically actuated device so that hydraulic fluid supplied by the hydraulic pump assembly to the hydraulically actuated device flows through the second flow path, wherein the proportional control valve is configured so that a pressure differential across a restriction area of the second flow path is less than 10% of a maximum system pressure when the opening position of the proportional control valve is within said first opening range.

2. A hydraulic system according to claim 1, wherein the hydraulic system is configured so that restriction of the proportional control valve is controlled independently to the output from the hydraulic pump assembly such that pressure of an inlet side of the hydraulically actuated device is controlled independently of the pressure of an outlet side of the hydraulically actuated device.

3. A hydraulic system according to claim 1, further comprising a plurality of hydraulically actuated devices and a corresponding plurality of proportional control valves, wherein the hydraulic system is arranged so that hydraulic fluid exiting each of the hydraulically actuated devices flows through a restriction of a respective proportional control valve.

4. A hydraulic system according to claim 3, further comprising a plurality of hydraulic pump assemblies for supplying a variable output of hydraulic fluid to the hydraulically actuated devices.

5. A hydraulic system according to claim 4, wherein the number of hydraulic pump assemblies corresponds to the number of hydraulically actuated devices, wherein the hydraulic system is configured to control a flow of hydraulic fluid entering each hydraulically actuated device via varying the output of hydraulic fluid from a respective hydraulic pump assembly, and to control a flow of hydraulic fluid exiting each hydraulically actuated device via varying a restriction of a respective proportional control valve.

6. A hydraulic system according to claim 3, wherein the number of hydraulic pump assemblies is less than the number of hydraulically actuated devices, and wherein one or more of the hydraulic pump assemblies is a shared pump assembly for supplying hydraulic fluid to two or more hydraulically actuated devices.

7. A hydraulic system according to claim 4, wherein the plurality of hydraulically-actuated devices comprise a left-hand track motor for actuating a left-hand track of the working vehicle and a right-hand track motor for actuating a right-hand track of the working vehicle, and wherein the left-hand track motor is supplied with hydraulic fluid from a first of the hydraulic pump assemblies and the right-hand track motor is supplied with hydraulic fluid from a second of the hydraulic pump assemblies.

8. A hydraulic system according to claim 4, wherein the plurality of hydraulically-actuated devices comprise a boom actuator for raising or lowering a working arm of the working vehicle and a dipper arm actuator for pivoting a dipper arm of the working vehicle relative to a boom of the working vehicle, and wherein the boom actuator is supplied with hydraulic fluid from one of the hydraulic pump assemblies and the dipper arm actuator is supplied with hydraulic fluid from a different one of the hydraulic pump assemblies.

9. A hydraulic system according to claim 1, wherein the or each hydraulic pump assembly is driven by a respective electric motor, and wherein the hydraulic system is configured such that output of hydraulic fluid from the or each hydraulic pump assembly is varied by adjusting a rotation speed of said electric motor.

10. A hydraulic system according to claim 1, further comprising a control system configured to control a flow rate and/or pressure of hydraulic fluid flowing through the hydraulic system; optionally.

11. A hydraulic system according to claim 10, wherein the control system is configured to set an opening position command of the or each proportional control valve to vary the restriction of the proportional control valve; optionally, wherein the control system is configured to determine a loading condition of the or each hydraulically actuated device and to adjust the restriction area of the respective proportional control valve in order to inhibit cavitation of said hydraulically actuated device.

12. A hydraulic system according to claim 11, wherein the control system is configured to:

monitor a loading condition of the or each hydraulically actuated device;

compare the or each of said monitored loading conditions against a respective loading condition threshold;

when one of said monitored loading conditions is less than its respective loading condition threshold, set an opening position command to decrease a restriction area of the first flow path of the respective proportional control valve; and when one of said monitored loading conditions is greater than its respective loading condition threshold, set an opening position command to increase the restriction area of the first flow path of the respective proportional control valve.

13. A hydraulic system according to claim 10, further comprising a plurality of hydraulically actuated devices and a plurality of hydraulic pump assemblies, wherein:

the number of hydraulic pump assemblies is less than the number of hydraulically actuated devices;

one or more of the hydraulic pump assemblies is a shared pump assembly for supplying hydraulic fluid to two or more hydraulically actuated devices;

wherein each of the hydraulically actuated devices supplied by the shared pump assembly is connected to the shared pump assembly via a respective proportional control valve and the control system is configured to set an opening position of each proportional control valve to vary a restriction area of said proportional control valve in order to control a share of the flow of hydraulic fluid supplied by the shared pump assembly between multiple hydraulically actuated devices; or wherein each of the hydraulically actuated devices supplied by the shared pump assembly is connected to the shared pump assembly via a respective pressure compensator and the control system is configured to set an opening position of each pressure compensator to vary a restriction area of said pressure compensator in order to control a share of the flow of hydraulic fluid supplied by the shared pump assembly between multiple hydraulically actuated devices, optionally, wherein the control system is configured to determine a required opening position of each pressure compensator based on the operating conditions of its respective hydraulic pump assembly and proportional control valve.

14. A working vehicle comprising a hydraulic system according to claim 1, wherein the working vehicle is an excavator, and wherein the working machine is an electric working vehicle, a fuel cell powered working vehicle, or a hybrid working vehicle having an electric source of power and an alternative source of power.

15. A hydraulic system for a working vehicle, the hydraulic system comprising:

a first group of hydraulically actuated devices which are actuated simultaneously to carry out a first set of functions of said working vehicle and which are not actuated in order to carry out a second set of functions of said working vehicle;

a second group of hydraulically actuated devices which are actuated simultaneously to carry out the second set of functions of said working vehicle and which are not actuated in order to carry out the first set of functions of said working vehicle; two or more hydraulic pump assemblies for supplying hydraulic fluid to the hydraulically actuated devices of the first and second groups;

wherein the hydraulic system is arranged so that each hydraulically actuated device of the first group is supplied by a different one of the hydraulic pump assemblies;

wherein the hydraulic system is arranged so that each hydraulically actuated device of the second group is supplied by a different one of the hydraulic pump assemblies; and wherein at least one of the hydraulic pump assemblies is arranged for supplying hydraulic fluid to both a hydraulically actuated device of the first group and a hydraulically actuated device of the second group; and wherein the first set of functions relates to movement of a working arm of said working vehicle, and wherein the first group of hydraulically actuated devices comprises two or more actuators associated with movement of said working arm; and/or wherein the second set of functions relates to movement of a chassis of said working vehicle, and wherein the second group of hydraulically actuated devices comprises two or more actuators associated with movement of the chassis.

16. A hydraulic system according to claim 15, wherein the first group of hydraulically actuated devices comprises at least two of: a boom actuator, a dipper arm actuator and/or an implement actuator; and/or wherein the second group of hydraulically actuated devices comprises a left track motor and a right track motor.

17. A hydraulic system according to claim 15, wherein the first group of hydraulically actuated devices comprises: a boom actuator for raising/lowering a boom of a working arm; a dipper actuator for pivoting a dipper arm of a working arm with respect to said boom; and an implement actuator for pivoting, extending or otherwise actuating an implement coupled to said dipper arm, wherein the second group of hydraulically actuated devices comprises a left track motor, a right track motor, wherein the left track motor and one of the boom actuator, dipper actuator and implement actuator are driven by a first of the hydraulic pump assemblies, wherein the right track motor and another of the boom actuator, dipper actuator and implement actuator are driven by a second of the hydraulic pump assemblies, and wherein the other of the boom actuator, dipper actuator and implement actuator is driven by a third of the hydraulic pump assemblies, or, where the second group of hydraulically actuated devices further comprises a dozer actuator for actuating a dozer blade of said working vehicle, the dozer actuator is driven by the third of the hydraulic pump assemblies.

18. A hydraulic system according to claim 15, wherein one or more hydraulically actuated devices of the first group and one or more hydraulically actuated devices of the second group are actuated simultaneously to carry out a third set of functions of said working vehicle, and wherein the third set of functions relate to simultaneous movement of a chassis of said working vehicle and movement of a working arm of said working vehicle.

19. A working vehicle comprising a hydraulic system according to claim 15, wherein the working vehicle is an excavator, and wherein the working machine is an electric working vehicle, a fuel cell powered working vehicle, or a hybrid working vehicle having an electric source of power and an alternative source of power.

20. A hydraulic system for a working vehicle, the hydraulic system comprising:

a plurality of hydraulically actuated devices;

one or more hydraulic pump assemblies for supplying a variable output of hydraulic fluid to the hydraulically actuated devices; and a plurality of proportional control valves, wherein the hydraulic system is arranged such that hydraulic fluid exiting each of the hydraulically actuated devices flows through a restriction of a respective one of the proportional control valves;

wherein the hydraulic system is configured to control a flow of hydraulic fluid supplied to the hydraulically actuated devices by varying the output of hydraulic fluid from the one or more hydraulic pump assemblies, and to control a flow of hydraulic fluid exiting each of the hydraulically actuated devices via adjusting a restriction area of the respective one of the proportional control valves; and wherein the number of hydraulic pump assemblies is less than the number of hydraulically actuated devices, and wherein one or more of the hydraulic pump assemblies is a shared pump assembly for supplying hydraulic fluid to two or more of the hydraulically actuated devices.

21. A hydraulic system according to claim 20, wherein the hydraulic system is configured so that restriction of the proportional control valves is controlled independently to the output from the one or more hydraulic pump assemblies such that pressure of an inlet side of each of the hydraulically actuated devices is controlled independently of the pressure of an outlet side of each of the hydraulically actuated devices.

22. A hydraulic system according to claim 20, wherein each of the proportional control valves is moveable within a first opening range between a first opening position and a second opening position, wherein each of the proportional control valves defines a first flow path through which a flow of hydraulic fluid from the respective one of the hydraulically actuated devices flows, and wherein each of the proportional control valves is configured so that a size of a restriction area of the first flow path decreases as the proportional control valve is moved from the first opening position to the second opening position in order to increase a pressure of hydraulic fluid in an outlet side of the respective one of the hydraulically actuated devices.

23. A hydraulic system according to claim 20, further comprising a plurality of hydraulic pump assemblies for supplying a variable output of hydraulic fluid to the hydraulically actuated devices.

24. A hydraulic system according to claim 20, wherein the hydraulic system is configured so that the shared pump assembly supplies hydraulic fluid to two or more hydraulically actuated devices simultaneously.

25. A hydraulic system according to claim 23, wherein the plurality of hydraulically-actuated devices comprise a left-hand track motor for actuating a left-hand track of the working vehicle and a right-hand track motor for actuating a right-hand track of the working vehicle, and wherein the left-hand track motor is supplied with hydraulic fluid from a first of the hydraulic pump assemblies and the right-hand track motor is supplied with hydraulic fluid from a second of the hydraulic pump assemblies.

26. A hydraulic system according to claim 23, wherein the plurality of hydraulically-actuated devices comprise a boom actuator for raising or lowering a working arm of the working vehicle and a dipper arm actuator for pivoting a dipper arm of the working vehicle relative to a boom of the working vehicle, and wherein the boom actuator is supplied with hydraulic fluid from one of the hydraulic pump assemblies and the dipper arm actuator is supplied with hydraulic fluid from a different one of the hydraulic pump assemblies.

27. A hydraulic system according to claim 24, wherein each of the hydraulically actuated devices supplied by the shared pump assembly is connected to the shared pump assembly via a respective pressure compensator, and wherein the pressure compensators are arranged to restrict flow into their respective hydraulically actuated devices to control a share of the flow of hydraulic fluid supplied by the shared pump assembly between multiple hydraulically actuated devices.

28. A hydraulic system according to claim 27, wherein each pressure compensator is biased open by a spring, wherein a compensator opening area of each pressure compensator is controlled by a pressure differential across a restriction area of the second flow path of a respective proportional control valve, and wherein the proportional control valve is configured so that said pressure differential across the restriction area of said second flow path is less than a set value of the pressure compensator spring when the opening position of the proportional control valve is within the first opening range and is greater than said set value of the pressure compensator spring when the opening position of the proportional control valve is outside the first opening range.

29. A hydraulic system according to claim 20, wherein the or each hydraulic pump assembly is driven by a respective electric motor, and wherein the hydraulic system is configured such that output of hydraulic fluid from the or each hydraulic pump assembly is varied by adjusting a rotation speed of said electric motor.

30. A hydraulic system according to claim 20, further comprising a control system configured to control a flow rate and/or pressure of hydraulic fluid flowing through the hydraulic system.

31. A hydraulic system according to claim 30, wherein the control system is configured to set an opening position command of each proportional control valve to vary the restriction of each proportional control valve.

32. A hydraulic system according to claim 31, wherein the control system is configured to:

monitor a loading condition of each hydraulically actuated device;

compare each of said monitored loading conditions against a respective loading condition threshold;

when one of said monitored loading conditions is less than its respective loading condition threshold, set an opening position command to decrease a restriction area of the first flow path of the respective proportional control valve; and when one of said monitored loading conditions is greater than its respective loading condition threshold, set an opening position command to increase the restriction area of the first flow path of the respective proportional control valve.

33. A hydraulic system according to claim 30, wherein each of the hydraulically actuated devices supplied by the shared pump assembly is connected to the shared pump assembly via a respective proportional control valve and the control system is configured to set an opening position of each proportional control valve to vary a restriction area of said proportional control valve in order to control a share of the flow of hydraulic fluid supplied by the shared pump assembly between multiple hydraulically actuated devices; or wherein each of the hydraulically actuated devices supplied by the shared pump assembly is connected to the shared pump assembly via a respective pressure compensator and the control system is configured to set an opening position of each pressure compensator to vary a restriction area of said pressure compensator in order to control a share of the flow of hydraulic fluid supplied by the shared pump assembly between multiple hydraulically actuated devices.

34. A working vehicle comprising a hydraulic system according to claim 20, wherein the working vehicle is an excavator, and wherein the working machine is an electric working vehicle, a fuel cell powered working vehicle, or a hybrid working vehicle having an electric source of power and an alternative source of power.

35. A hydraulic system for a working vehicle, the hydraulic system comprising:

a plurality of hydraulically actuated devices;

a plurality of hydraulic pump assemblies for supplying a variable output of hydraulic fluid to the hydraulically actuated devices; and a plurality of proportional control valves, wherein the hydraulic system is arranged such that hydraulic fluid exiting each of the hydraulically actuated devices flows through a restriction of a respective one of the proportional control valves; and wherein the hydraulic system is configured to control a flow of hydraulic fluid supplied to the hydraulically actuated devices by varying the output of hydraulic fluid from the hydraulic pump assemblies, and to control a flow of hydraulic fluid exiting each of the hydraulically actuated devices via adjusting a restriction area of the respective one of the proportional control valves, wherein the plurality of hydraulically actuated devices comprises a left-hand track motor for actuating a left-hand track of the working vehicle and a right-hand track motor for actuating a right-hand track of the working vehicle, and wherein the left-hand track motor is supplied with hydraulic fluid from a first of the hydraulic pump assemblies and the right-hand track motor is supplied with hydraulic fluid from a second of the hydraulic pump assemblies.

36. A hydraulic system according to claim 35, wherein the hydraulic system is configured so that restriction of the proportional control valves is controlled independently to the output from the hydraulic pump assemblies such that pressure of an inlet side of each of the hydraulically actuated devices is controlled independently of the pressure of an outlet side of each of the hydraulically actuated devices.

37. A hydraulic system according to claim 35, wherein each of the proportional control valves is moveable within a first opening range between a first opening position and a second opening position, wherein each of the proportional control valves defines a first flow path through which a flow of hydraulic fluid from the respective one of the hydraulically actuated devices flows, and wherein each of the proportional control valves is configured so that a size of a restriction area of the first flow path decreases as the proportional control valve is moved from the first opening position to the second opening position in order to increase a pressure of hydraulic fluid in an outlet side of the respective one of the hydraulically actuated devices.

38. A hydraulic system according to claim 35, wherein the number of hydraulic pump assemblies corresponds to the number of hydraulically actuated devices, wherein the hydraulic system is configured to control a flow of hydraulic fluid entering each hydraulically actuated device via varying the output of hydraulic fluid from a respective hydraulic pump assembly, and to control a flow of hydraulic fluid exiting each hydraulically actuated device via varying a restriction of a respective proportional control valve.

39. A hydraulic system according to claim 35, wherein the first of the hydraulic pump assemblies is a shared pump assembly for supplying hydraulic fluid to the left-hand track motor and a first working arm actuator for actuating a working arm of the working vehicle, and/or wherein the second of the hydraulic pump assemblies is a shared pump assembly for supplying hydraulic fluid to the right-hand track motor and a second working arm actuator for actuating a working arm of the working vehicle.

40. A hydraulic system according to claim 35, wherein the plurality of hydraulically-actuated devices comprise a boom actuator for raising or lowering a working arm of the working vehicle and a dipper arm actuator for pivoting a dipper arm of the working vehicle relative to a boom of the working vehicle, and wherein the boom actuator is supplied with hydraulic fluid from one of the hydraulic pump assemblies and the dipper arm actuator is supplied with hydraulic fluid from a different one of the hydraulic pump assemblies.

41. A hydraulic system according to claim 35, wherein each hydraulic pump assembly is driven by a respective electric motor, and wherein the hydraulic system is configured such that output of hydraulic fluid from each hydraulic pump assembly is varied by adjusting a rotation speed of said electric motor.

42. A hydraulic system according to claim 35, further comprising a control system configured to control a flow rate and/or pressure of hydraulic fluid flowing through the hydraulic system.

43. A hydraulic system according to claim 42, wherein the control system is configured to set an opening position command of each proportional control valve to vary the restriction of each proportional control valve.

44. A hydraulic system according to claim 43, wherein the control system is configured to:

monitor a loading condition of each hydraulically actuated device;

compare each of said monitored loading conditions against a respective loading condition threshold;

when one of said monitored loading conditions is less than its respective loading condition threshold, set an opening position command to decrease a restriction area of the first flow path of the respective proportional control valve; and when one of said monitored loading conditions is greater than its respective loading condition threshold, set an opening position command to increase the restriction area of the first flow path of the respective proportional control valve.

45. A hydraulic system according to claim 42, wherein:

the number of hydraulic pump assemblies is less than the number of hydraulically actuated devices;

one or more of the hydraulic pump assemblies is a shared pump assembly for supplying hydraulic fluid to two or more hydraulically actuated devices;

wherein each of the hydraulically actuated devices supplied by the shared pump assembly is connected to the shared pump assembly via a respective proportional control valve and the control system is configured to set an opening position of each proportional control valve to vary a restriction area of said proportional control valve in order to control a share of the flow of hydraulic fluid supplied by the shared pump assembly between multiple hydraulically actuated devices; or wherein each of the hydraulically actuated devices supplied by the shared pump assembly is connected to the shared pump assembly via a respective pressure compensator and the control system is configured to set an opening position of each pressure compensator to vary a restriction area of said pressure compensator in order to control a share of the flow of hydraulic fluid supplied by the shared pump assembly between multiple hydraulically actuated devices.

46. A working vehicle comprising a hydraulic system according to claim 35, wherein the working vehicle is an excavator, and wherein the working machine is an electric working vehicle, a fuel cell powered working vehicle, or a hybrid working vehicle having an electric source of power and an alternative source of power.

47. A hydraulic system for a working vehicle, the hydraulic system comprising:

a plurality of hydraulically actuated devices;

a plurality of hydraulic pump assemblies for supplying a variable output of hydraulic fluid to the hydraulically actuated devices; and a plurality of proportional control valves, wherein the hydraulic system is arranged such that hydraulic fluid exiting each of the hydraulically actuated devices flows through a restriction of a respective one of the proportional control valves; and wherein the hydraulic system is configured to control a flow of hydraulic fluid supplied to the hydraulically actuated devices by varying the output of hydraulic fluid from the hydraulic pump assemblies, and to control a flow of hydraulic fluid exiting each of the hydraulically actuated devices via adjusting a restriction area of the respective one of the proportional control valves;

wherein the plurality of hydraulically actuated devices comprises a boom actuator for raising or lowering a working arm of the working vehicle and a dipper arm actuator for pivoting a dipper arm of the working vehicle relative to a boom of the working vehicle, and wherein the boom actuator is supplied with hydraulic fluid from one of the hydraulic pump assemblies and the dipper arm actuator is supplied with hydraulic fluid from a different one of the hydraulic pump assemblies.

48. A hydraulic system according to claim 47, wherein the hydraulic system is configured so that restriction of the proportional control valves is controlled independently to the output from the hydraulic pump assemblies such that pressure of an inlet side of each of the hydraulically actuated devices is controlled independently of the pressure of an outlet side of each of the hydraulically actuated devices.

49. A hydraulic system according to claim 47, wherein each of the proportional control valves is moveable within a first opening range between a first opening position and a second opening position, wherein each of the proportional control valves defines a first flow path through which a flow of hydraulic fluid from the respective one of the hydraulically actuated devices flows, and wherein each of the proportional control valves is configured so that a size of a restriction area of the first flow path decreases as the proportional control valve is moved from the first opening position to the second opening position in order to increase a pressure of hydraulic fluid in an outlet side of the respective one of the hydraulically actuated devices.

50. A hydraulic system according to claim 47, wherein the number of hydraulic pump assemblies corresponds to the number of hydraulically actuated devices, wherein the hydraulic system is configured to control a flow of hydraulic fluid entering each hydraulically actuated device via varying the output of hydraulic fluid from a respective hydraulic pump assembly, and to control a flow of hydraulic fluid exiting each hydraulically actuated device via varying a restriction of a respective proportional control valve.

51. A hydraulic system according to claim 47, wherein each hydraulic pump assembly is driven by a respective electric motor, and wherein the hydraulic system is configured such that output of hydraulic fluid from each hydraulic pump assembly is varied by adjusting a rotation speed of said electric motor.

52. A hydraulic system according to claim 47, further comprising a control system configured to control a flow rate and/or pressure of hydraulic fluid flowing through the hydraulic system.

53. A hydraulic system according to claim 52, wherein:

the number of hydraulic pump assemblies is less than the number of hydraulically actuated devices;

one or more of the hydraulic pump assemblies is a shared pump assembly for supplying hydraulic fluid to two or more hydraulically actuated devices;

wherein each of the hydraulically actuated devices supplied by the shared pump assembly is connected to the shared pump assembly via a respective proportional control valve and the control system is configured to set an opening position of each proportional control valve to vary a restriction area of said proportional control valve in order to control a share of the flow of hydraulic fluid supplied by the shared pump assembly between multiple hydraulically actuated devices; or wherein each of the hydraulically actuated devices supplied by the shared pump assembly is connected to the shared pump assembly via a respective pressure compensator and the control system is configured to set an opening position of each pressure compensator to vary a restriction area of said pressure compensator in order to control a share of the flow of hydraulic fluid supplied by the shared pump assembly between multiple hydraulically actuated devices.

54. A hydraulic system according to claim 52, wherein the control system is configured to set an opening position command of each proportional control valve to vary the restriction of each proportional control valve.

55. A hydraulic system according to claim 54, wherein the control system is configured to:

monitor a loading condition of each hydraulically actuated device;

compare each of said monitored loading conditions against a respective loading condition threshold;

when one of said monitored loading conditions is less than its respective loading condition threshold, set an opening position command to decrease a restriction area of the first flow path of the respective proportional control valve; and when one of said monitored loading conditions is greater than its respective loading condition threshold, set an opening position command to increase the restriction area of the first flow path of the respective proportional control valve.

56. A working vehicle comprising a hydraulic system according to claim 47, wherein the working vehicle is an excavator, and wherein the working machine is an electric working vehicle, a fuel cell powered working vehicle, or a hybrid working vehicle having an electric source of power and an alternative source of power.

57. A hydraulic system for a working vehicle, the hydraulic system comprising:

a hydraulically actuated device;

a hydraulic pump assembly for supplying a variable output of hydraulic fluid to the hydraulically actuated device; and a proportional control valve, wherein the hydraulic system is arranged such that hydraulic fluid exiting the hydraulically actuated device flows through a restriction of the proportional control valve;

wherein the hydraulic system is configured to control a flow of hydraulic fluid supplied to the hydraulically actuated device by varying the output of hydraulic fluid from the hydraulic pump assembly, and to control a flow of hydraulic fluid exiting the hydraulically actuated device via adjusting a restriction area of the proportional control valve; and wherein the hydraulic pump assembly is driven by an electric motor, and wherein the hydraulic system is configured such that output of hydraulic fluid from the hydraulic pump assembly is varied by adjusting a rotation speed of said electric motor.

58. A hydraulic system according to claim 57, wherein the hydraulic system is configured so that restriction of the proportional control valve is controlled independently to the output from the hydraulic pump assembly such that pressure of an inlet side of the hydraulically actuated device is controlled independently of the pressure of an outlet side of the hydraulically actuated device.

59. A hydraulic system according to claim 57, wherein the proportional control valve is moveable within a first opening range between a first opening position and a second opening position, wherein the proportional control valve defines a first flow path through which a flow of hydraulic fluid from the hydraulically actuated device flows, and wherein the proportional control valve is configured so that a size of a restriction area of the first flow path decreases as the proportional control valve is moved from the first opening position to the second opening position in order to increase a pressure of hydraulic fluid in an outlet side of the hydraulically actuated device.

60. A hydraulic system according to claim 57, further comprising a plurality of hydraulically actuated devices and a corresponding plurality of proportional control valves, wherein the hydraulic system is arranged so that hydraulic fluid exiting each of the hydraulically actuated devices flows through a restriction of a respective proportional control valve.

61. A hydraulic system according to claim 60, further comprising a plurality of hydraulic pump assemblies for supplying a variable output of hydraulic fluid to the hydraulically actuated devices.

62. A hydraulic system according to claim 61, wherein the number of hydraulic pump assemblies corresponds to the number of hydraulically actuated devices, wherein the hydraulic system is configured to control a flow of hydraulic fluid entering each hydraulically actuated device via varying the output of hydraulic fluid from a respective hydraulic pump assembly, and to control a flow of hydraulic fluid exiting each hydraulically actuated device via varying a restriction of a respective proportional control valve.

63. A hydraulic system according to claim 57, further comprising a control system configured to control a flow rate and/or pressure of hydraulic fluid flowing through the hydraulic system.

64. A hydraulic system according to claim 63, wherein the control system is configured to set an opening position command of the or each proportional control valve to vary the restriction of the proportional control valve.

65. A hydraulic system according to claim 64, wherein the control system is configured to:

monitor a loading condition of the or each hydraulically actuated device;

compare the or each of said monitored loading conditions against a respective loading condition threshold;

when one of said monitored loading conditions is less than its respective loading condition threshold, set an opening position command to decrease a restriction area of the first flow path of the respective proportional control valve; and when one of said monitored loading conditions is greater than its respective loading condition threshold, set an opening position command to increase the restriction area of the first flow path of the respective proportional control valve.

66. A hydraulic system according to claim 63, further comprising a plurality of hydraulically actuated devices and a plurality of hydraulic pump assemblies, wherein:

the number of hydraulic pump assemblies is less than the number of hydraulically actuated devices;

one or more of the hydraulic pump assemblies is a shared pump assembly for supplying hydraulic fluid to two or more hydraulically actuated devices;

wherein each of the hydraulically actuated devices supplied by the shared pump assembly is connected to the shared pump assembly via a respective proportional control valve and the control system is configured to set an opening position of each proportional control valve to vary a restriction area of said proportional control valve in order to control a share of the flow of hydraulic fluid supplied by the shared pump assembly between multiple hydraulically actuated devices; or wherein each of the hydraulically actuated devices supplied by the shared pump assembly is connected to the shared pump assembly via a respective pressure compensator and the control system is configured to set an opening position of each pressure compensator to vary a restriction area of said pressure compensator in order to control a share of the flow of hydraulic fluid supplied by the shared pump assembly between multiple hydraulically actuated devices.

67. A working vehicle comprising a hydraulic system according to claim 57, wherein the working vehicle is an excavator, and wherein the working machine is an electric working vehicle, a fuel cell powered working vehicle, or a hybrid working vehicle having an electric source of power and an alternative source of power.

* * * * *